United States Patent [19]

Krall

[11] Patent Number: 4,614,018

[45] Date of Patent: Sep. 30, 1986

[54] ARTICLE TRIMMING APPARATUS

[75] Inventor: Thomas J. Krall, Toledo, Ohio

[73] Assignee: Owens-Illinois, Inc., Toledo, Ohio

[21] Appl. No.: 594,599

[22] Filed: Mar. 29, 1984

[51] Int. Cl.[4] .......................... B23B 3/04; B23B 5/14
[52] U.S. Cl. ................................. 29/33 J; 29/564.8;
29/566.1; 264/536; 414/225; 414/744 B;
425/806
[58] Field of Search ................... 29/33 A, 564, 564.1,
29/564.2, 564.3, 564.7, 564.8, 566, 566.1;
264/536, 161; 414/744 B, 225; 425/302.1, 527,
804; 82/101

[56] References Cited

U.S. PATENT DOCUMENTS

| 2,032,127 | 2/1936 | Holmes | 29/335 X |
|---|---|---|---|
| 2,359,432 | 10/1944 | McNamara | 414/744 B |
| 3,270,116 | 8/1966 | Ruekberg | 264/161 X |
| 3,417,428 | 12/1968 | Rupert | 264/536 X |
| 3,763,297 | 10/1973 | Piero et al. | 266/536 |
| 4,124,668 | 11/1978 | Frohn | 264/161 X |
| 4,150,080 | 4/1979 | Hagen | 264/161 X |
| 4,445,406 | 5/1984 | Thatcher | 264/536 X |

Primary Examiner—Gil Weidenfeld
Assistant Examiner—Glenn L. Webb
Attorney, Agent, or Firm—Philip M. Rice

[57] ABSTRACT

A method and apparatus for trimming molded hollow plastic articles having flash and a finish for a closure. Articles are moved in succession through the load, deflashing, facing, inspection, rejection and unload stations of a trimming apparatus by vacuum heads. The articles are picked up by vacuum heads and transferred through the stations by intermittent rotation of a turre carrying the vacuum heads. To ensure proper location, each article is picked up in the load station by a vacuum head and continuously engaged by this vacuum head throughout the deflashing, facing and inspection stations and into the unloading station unnless rejected and released in the rejection station.

To facilitate loading, unloading and operations in the work stations on the articles, their orientation can be changed from one station to another. To enable variation of the cycle time of the apparatus, the turret and the operating mechanism in the various stations is driven by a common variable speed drive. To enable the apparatus to trim runs of articles of different sizes, the position of the operating mechanism of the various work stations with respect to the vacuum heads for carrying articles can be adjusted.

57 Claims, 37 Drawing Figures

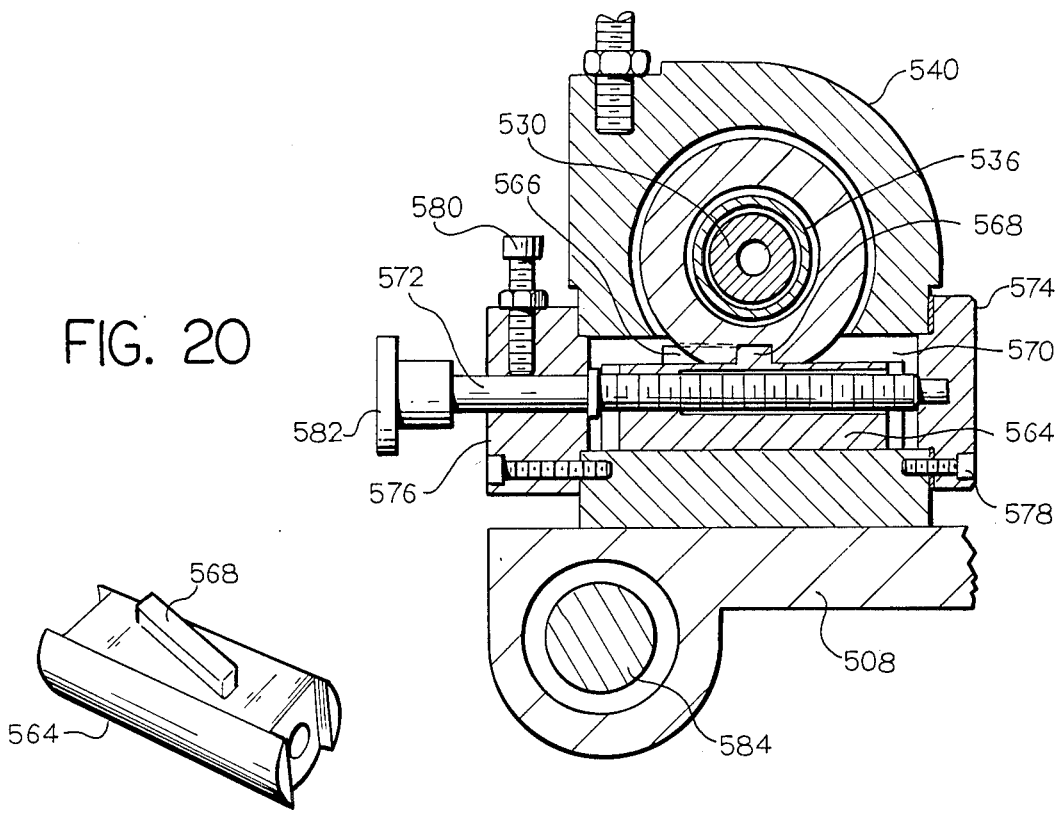
FIG. 20
FIG. 21
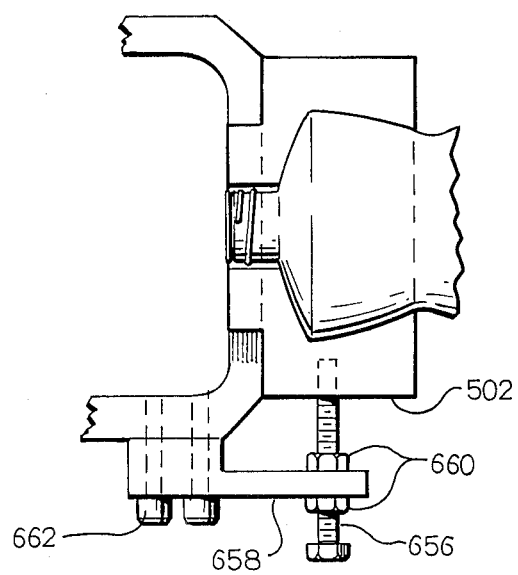
FIG. 23

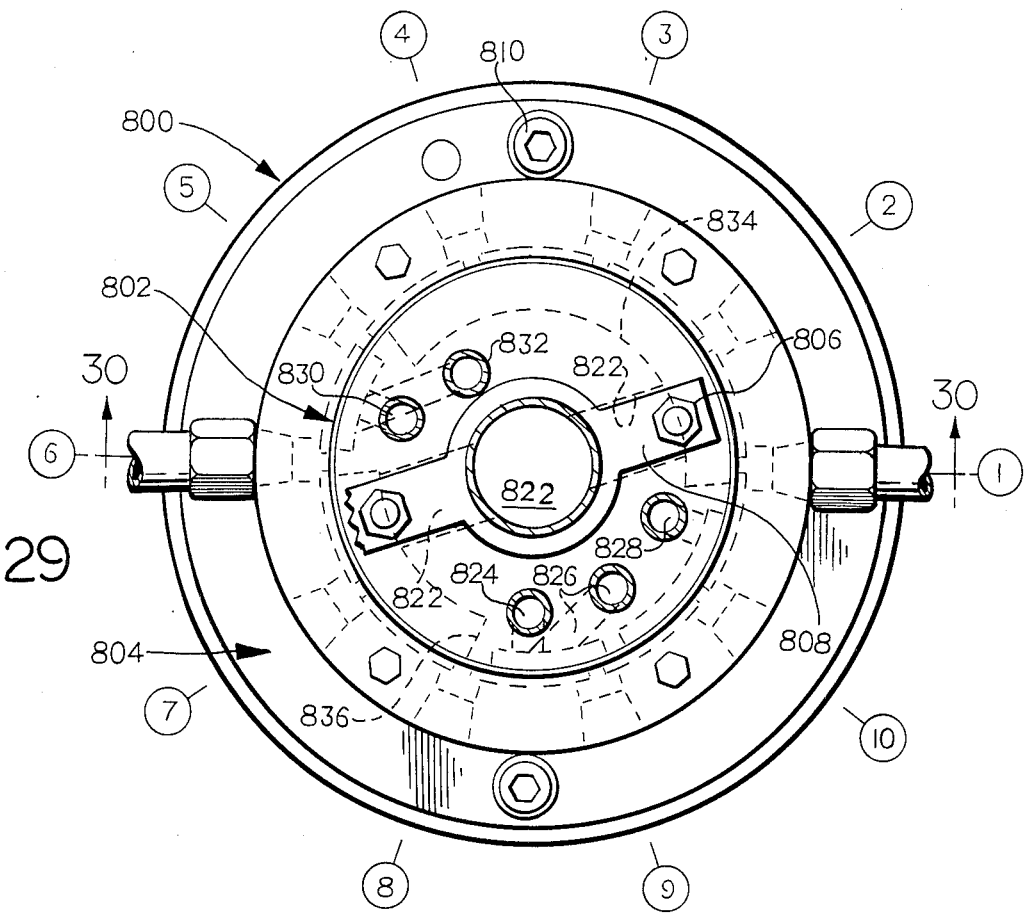
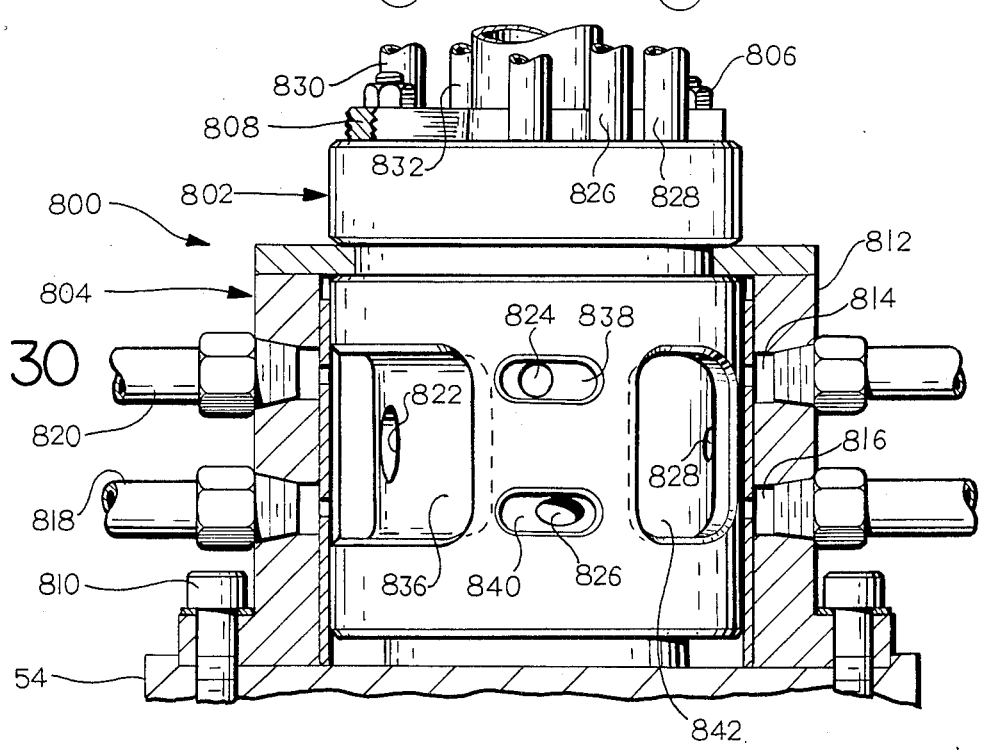

ARTICLE TRIMMING APPARATUS

BACKGROUND OF THE INVENTION

This invention relates to the trimming of molded articles and more particularly to the trimming of the flash and finish of hollow plastic articles.

When formed in dies, hollow plastic articles such as containers or bottles usually have flash in at least one of the shoulder, neck and finish areas. The finish also has material which must be removed to provide an end face for sealing engagement with a closure or cap engageable with the neck of the article.

Various methods and apparatus have been previously used to remove the flash from an article and machine a face on the finish. In these methods, a separate apparatus or machine has been used to perform each step of removing the flash, removing material from the finish, forming a face on the finish, and inspecting the completed article. Conveyors move the articles from one machine to the next and separate transfer mechanisms associated with each machine pickup and load articles into each machine and unload articles from each machine.

SUMMARY OF THE INVENTION

In the method and apparatus of this invention, hollow plastic articles to be trimmed are intermittently advanced through a plurality of generally circumferentially spaced stations by a turret carrying vacuum heads engaging the articles. To assure positive and accurate location of the articles in each station, each vacuum head picks up and engages an article in a load station and continuously engages the same article throughout all successive stations unless the article is rejected and released prior to the unload station. Preferably, to facilitate processing runs of articles of different sizes, the articles are located and engaged relative to a bottom edge thereof. Preferably, to facilitate loading, unloading and processing of articles in the stations, each vacuum head can be moved to change the orientation of the axis of the article it is carrying from one station to another. Preferably, when at least two articles are processed at the same time in a station, the articles are laterally spaced apart when carried by each vacuum head assembly to facilitate processing them in the station. Preferably, to facilitate changing the cycle time of the trimming apparatus, the turret and the loading and processing equipment in the various stations are all driven by a common variable speed drive. Preferably, to facilitate processing runs of articles of different sizes, the location of the processing equipment in each station can be varied and adjusted with respect to the position of articles in the station engaged by the vacuum heads.

OBJECTS, FEATURES AND ADVANTAGES OF THIS INVENTION

Objects, features and advantages of this invention are to provide a method and apparatus for trimming molded plastic articles which positively and accurately picks up and locates the articles for processing and unloading, facilitates processing by changing when needed the orientation of the articles from one station to another, can be readily and easily adapted to trimming runs of different size articles, utilizes a common locator point for the articles to facilitate loading, processing and unloading of runs of different size articles, can easily and readily vary the cycle time for loading, processing and unloading articles, has a substantially increased output of trimmed articles, produces relatively few unacceptable trimmed articles or scrap, is rugged, durable and highly reliable, has a long service life with little down time, and requires relatively little service, maintenance and repair.

BRIEF DESCRIPTION OF THE DRAWINGS

These and other objects, features and advantages of this invention will be apparent from the following detailed description, appended claims and accompanying drawings in which:

FIG. 20 is a fragmentary sectional view taken generally on line 20—20 of FIG. 17 and illustrating a quill adjuster of the facer mechanism;

FIG. 21 is a perspective view of a cam element of the adjuster;

FIG. 23 is a fragmentary sectional view taken generally on line 23—23 of FIG. 17 and illustrating a mechanism for adjusting the position of a nest of the article clamping fixture;

FIG. 29 is a plan view of a vacuum and air distributor for the vacuum heads of the trimming apparatus of FIG. 1;

FIG. 30 is a sectional view taken generally on line 30—30 of FIG. 29 and illustrating a cylinder of the distributor;

DETAILED DESCRIPTION OF THE INVENTION

Figure 1:
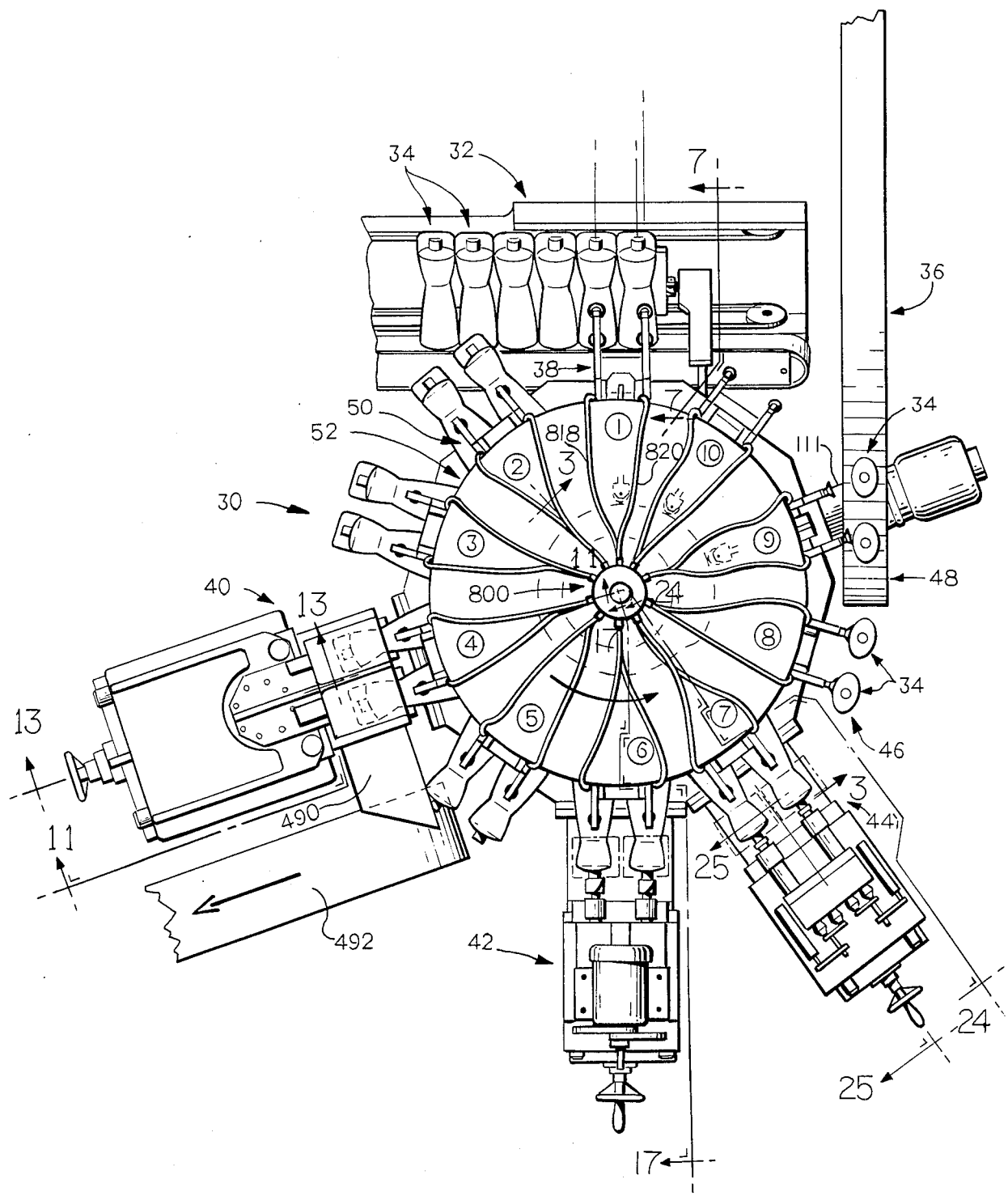
FIG. 1 is a plan view of a trimming apparatus of this invention associated with an accumulating conveyor for articles to be trimmed and a conveyor for carrying away from the apparatus trimmed articles.

Referring in more detail to the drawings, FIG. 1 illustrates a trimming apparatus 30 of this invention in operative relationship with a conveyor and accumulator 32 with a plurality of articles 34 to be trimmed thereon and a conveyor 36 receiving and carrying away trimmed articles 34' which have passed inspection. The apparatus 30 has ten stations including a load station 38, a deflash station 40, a facing station 42, an inspection 44 station, a reject and release station 46, an unload station 48, and several idle stations. If needed to process any run of articles, additional equipment can be added in the idle stations. For reference, the stations are numbered 1 through 10 beginning with the load station 38 and proceeding counterclockwise (as shown in FIG. 1) around the apparatus.

In the load station, articles 34 are transferred from the accumulator conveyor to one of a plurality of vacuum pickup head assemblies 50 carried by a turret assembly 52 which intermittently rotates counterclockwise (as viewed in FIG. 1) to sequentially advance the articles through a plurality of the stations.

TURRET ASSEMBLY

Figure 2:
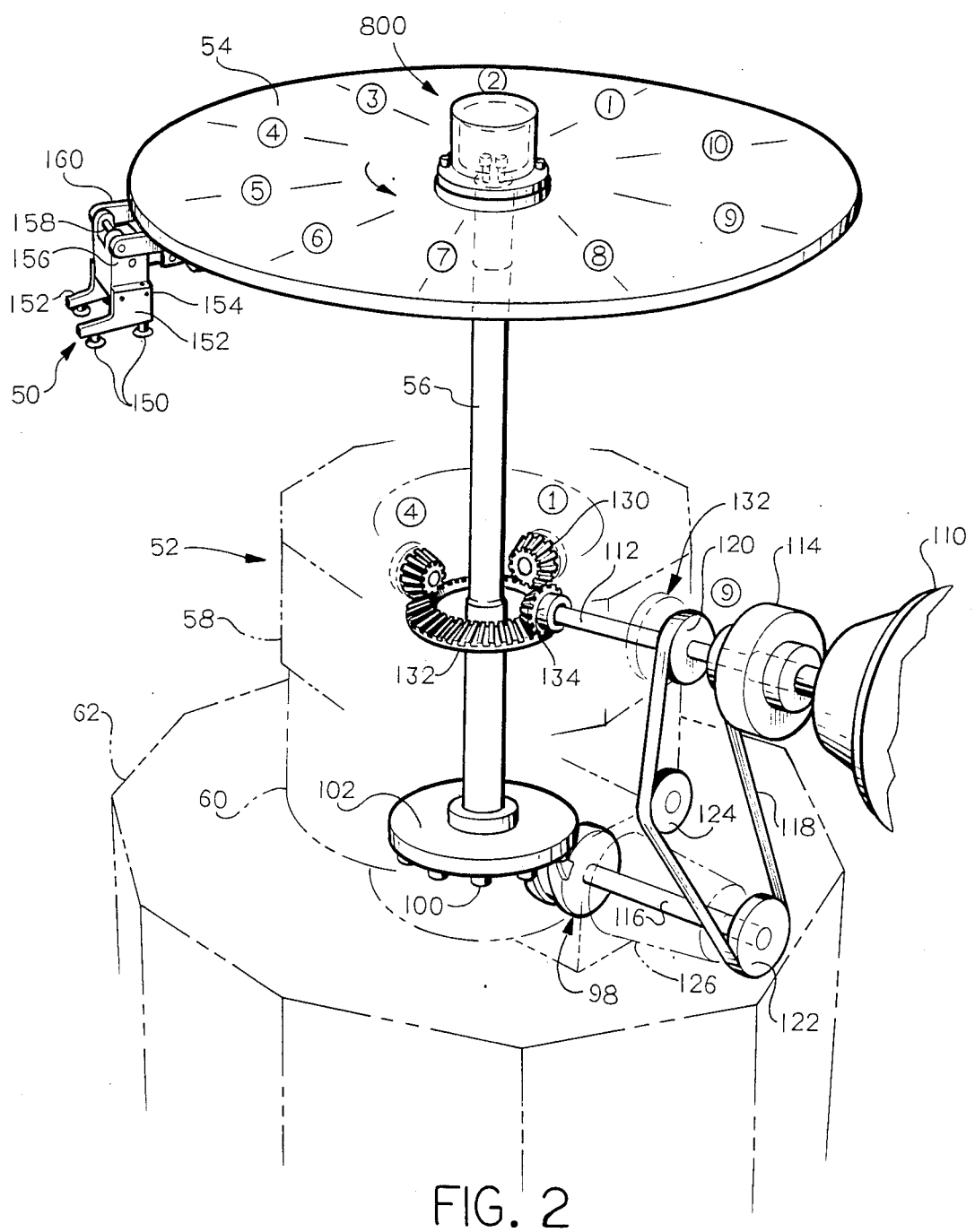
FIG. 2 is a fragmentary perspective and somewhat schematic view of a turret and a portion of the turret drive train of the apparatus of FIG. 1.
Figure 3:
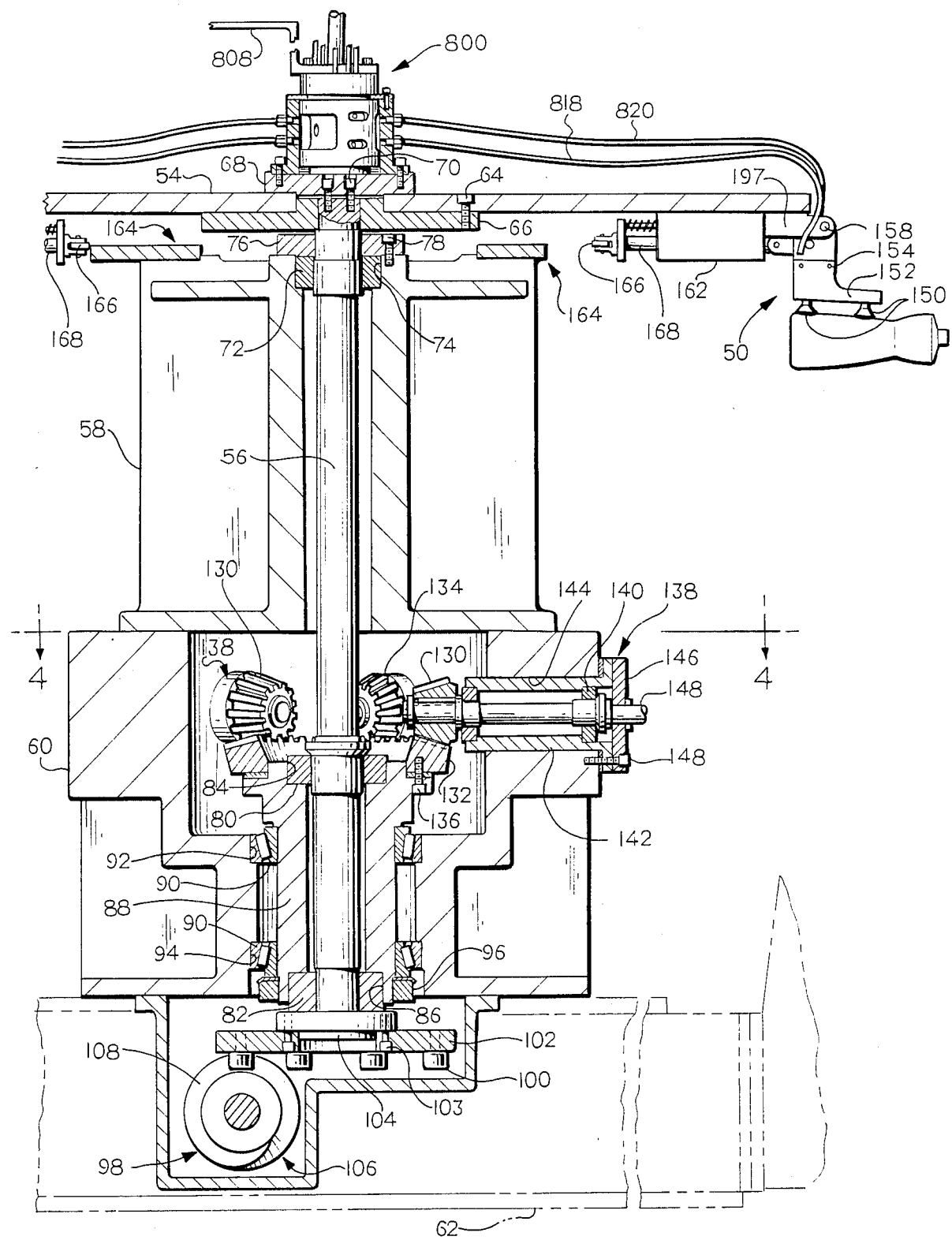
FIG. 3 is a fragmentary sectional view taken generally on line 3—3 of FIG. 1 illustrating a portion of a drive mechanism for rotating the turret.
Figure 4:
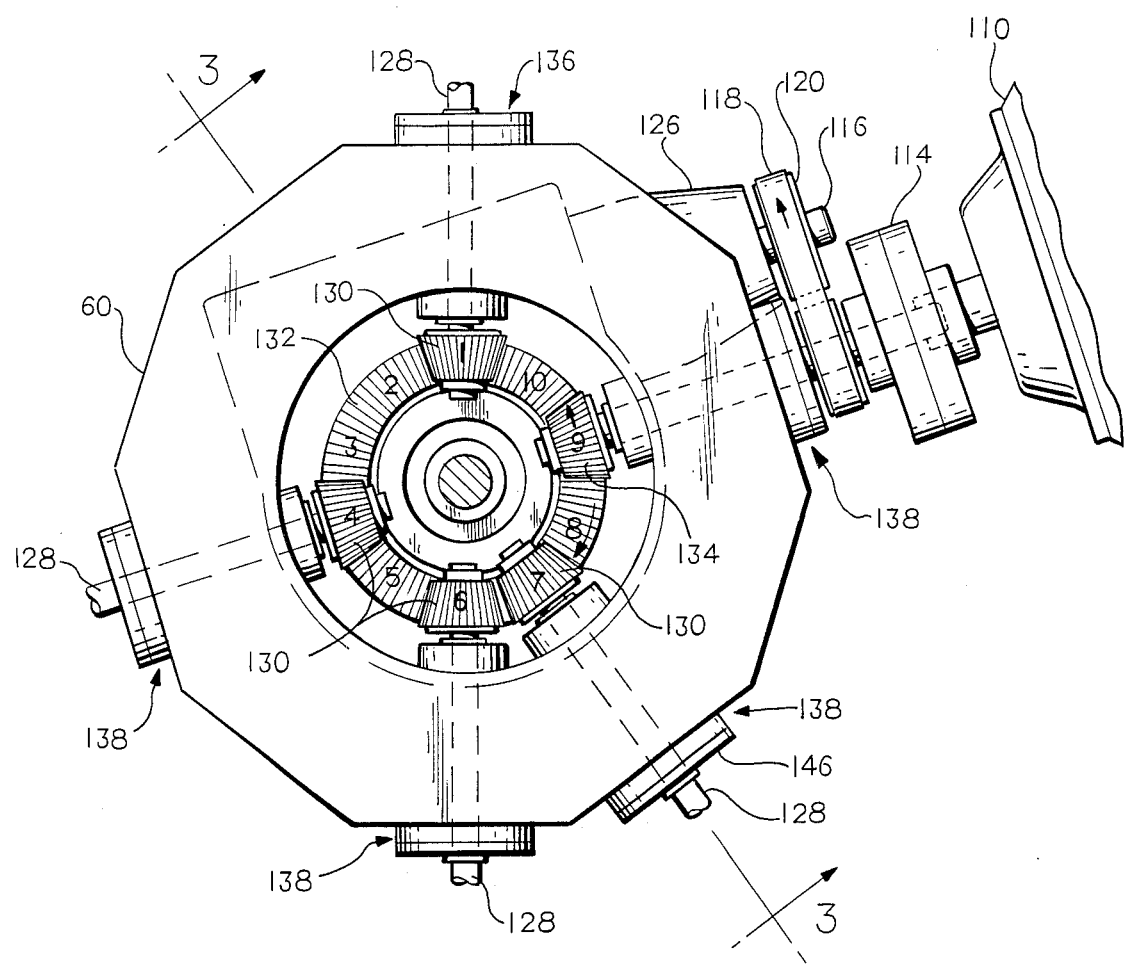
FIG. 4 is a fragmentary sectional view taken generally on line 4—4 of FIG. 3.

As shown in FIGS. 2 and 3, the turret assembly 52 has a turntable 54 secured to a drive shaft 56 received in column housings 58 and 60. The lower housing 60 is secured to a base 62 of the trimming apparatus. The turntable 54 is secured by cap screws 64 to a hub 66 received on the upper end of the shaft 56 and keyed thereto for rotation therewith. The turntable 54 and the hub 66 are retained on the shaft 56 by an overlapping disk 68 secured by cap screws 70 to the end of the shaft.

The upper end of the shaft 56 is journaled in a bearing 72 received in a counterbore 74 in the upper end of the housing 58 and captured therein by a retainer ring 76 secured to the housing by cap screws 78. The lower end of the shaft 56 is journaled by bearings 80 and 82 received in counterbores 84 and 86 in a carrier sleeve 88. The carrier sleeve 88 is journaled for rotation in the lower housing 60 by a pair of bearings 90 received in counterbores 92 and 94 in the housing. The carrier sleeve 88 and the bearings 90 are retained in assembled relation in the housing by a retainer ring 96 threaded on the sleeve adjacent its lower end.

The turntable 54 is intermittently rotated to advance the vacuum head assemblies 50 by the cooperation of a barrel cam 98 with ten cam followers 100. The cam followers are equally circumferentially spaced on a carrier disk 102 secured by cap screws 103 to a hub 104 secured to the bottom of the shaft 56 for rotation therewith. So that the barrel cam 98 can be rotated continuously while only intermittently rotating the turntable 54, it has a cam groove or track 106 with a dwell section 108 therein. To ensure positive indexing of the turntable, before one follower becomes completely disengaged from the track 106 of the cam an immediately succeeding follower is engaged by the track.

DRIVE ASSEMBLY

In accordance with this invention, to easily vary the cycle time of the trimming apparatus, both the turntable 54 and some of the mechanism in the various stations is driven by a common variable speed electric motor 110. The motor 110 is mounted on a sub base 111 (FIG. 1) secured to the base 62. The motor drives the barrel cam 98 to rotate the turntable 54 through a drive shaft 112 connected by a coupling 114 to the motor and a driven shaft 116 connected to the barrel cam. These shafts are coupled by a timing belt 118 and pulleys 120 and 122 fixed to the drive and driven shafts. Tension is maintained on the timing belt by an idler pulley 124. The driven shaft 116 is journaled for rotation in a bearing sleeve 126 secured to the lower housing 60 and is keyed to the barrel cam 98.

A variable speed transmission driven by a single speed electric motor could be used in lieu of the variable speed electric motor. However, for ease of adjustment and operation a variable speed electric motor is preferred.

Each station having equipment driven by the motor 110 is connected to the motor through a power takeoff shaft 128 with a pinion 130 keyed to one end which meshes with a ring gear 132 driven by a meshed pinion 134 keyed to the drive shaft 112. The ring gear 132 is secured by cap screws 136 to the carrier sleeve 88 for rotation therewith. Each power takeoff shaft 128 is received in a bearing assembly 138 having a pair of bearings 140 carried by a collar 142 received in a bore 144. Both the collar and an overlying retainer and cover plate 146 are secured by cap sleeve 148 to the housing. The drive shaft 112 is also received in a bearing assembly 138 secured to the housing.

VACUUM HEAD ASSEMBLY

Figure 5:
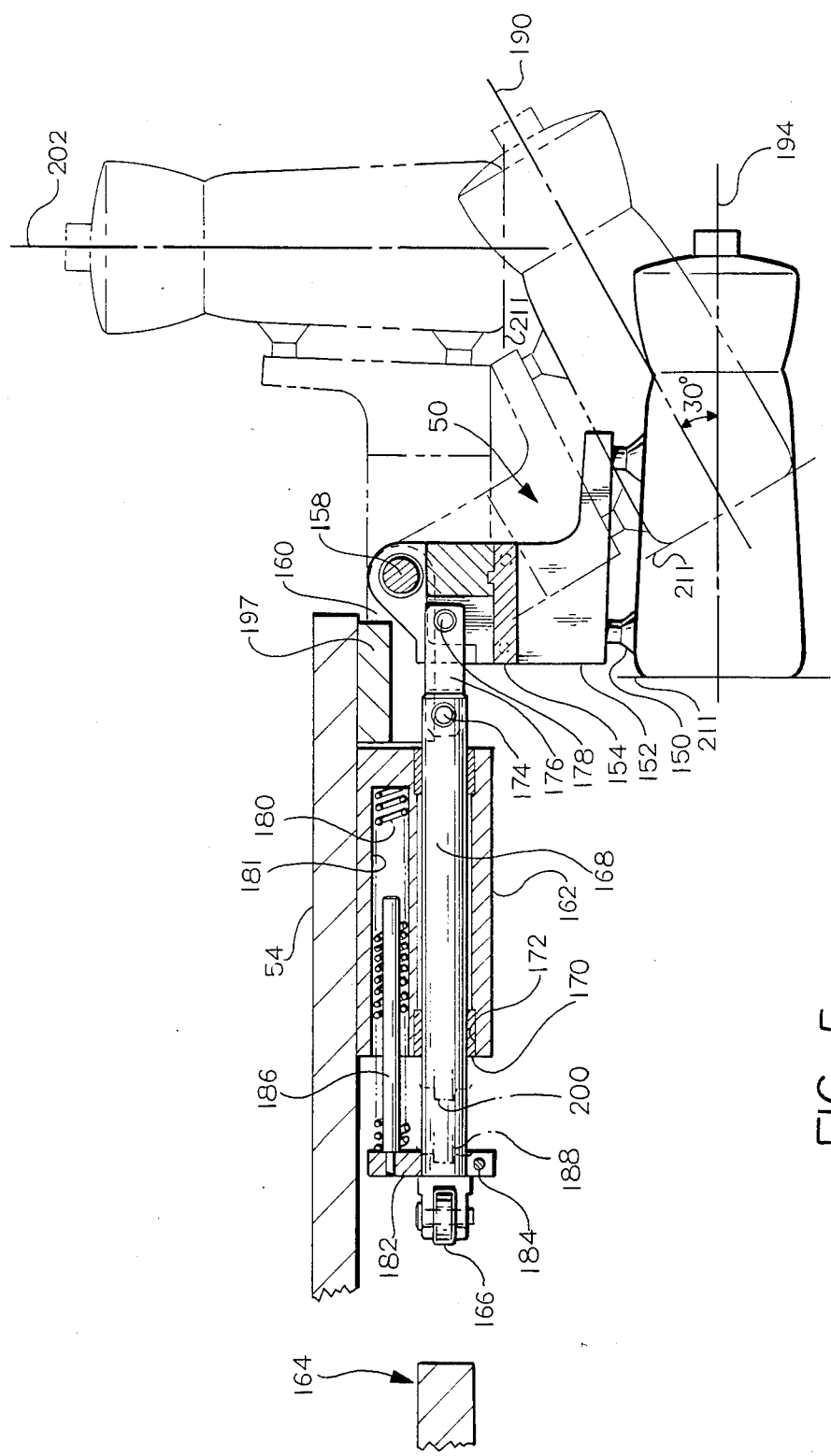
FIG. 5 is an enlarged and fragmentary sectional view illustrating a vacuum head assembly of the apparatus of FIG. 1.

As shown in FIG. 1, ten vacuum head assemblies 50 are equally circumferentially spaced on the turntable 54. Preferably, each vacuum head assembly engages and carries two articles in side by side and spaced apart relationship. As shown in FIGS. 3 and 5, each article 34 is engaged and held by a pair of vacuum cups 150 secured to a carrier plate 152. A pair of the carrier plates 152 are secured by cap screws 154 to a spacer block 156 pivoted on a pin 158 secured to a pair of spaced apart carrier arms 160 fixed to a mounting block 162 secured to the turntable 154.

In accordance with another feature of this invention, as each vacuum head 50 is moved one station to another, the orientation of the head and any articles it is carrying can be changed to facilitate the loading, processing and unloading of the articles. As shown in FIGS. 3 and 5, the orientation of each vacuum head is changed by the cooperation of a cam 164 secured to the upper housing 58 by screws 165 and a cam follow 166 associated with the head which is moved around the outer periphery of the cam when the turntable is rotated. Each follower is secured to one end of an associated actuator rod 168 which is slidably received in bushings 170 pressed in counter bores 172 in the mounting block. The other end of the actuator rod 168 is connected by a link 174 and pivot pins 176 and 178 to the spacer block 156. The follower and actuator are yieldably biased toward the cam by a compression spring 180 received in a blind hole 181 in the mounting block 162 with one end bearing on an adjustable clamp plate 182 with a split collar encircling and frictionally secured to the actuator rod by a cap screw 184. To guide the portion of the spring protruding from the pocket, a pin 186 is secured to the clamp plate and projects through one end of the spring and into the blind hole.

Figure 6:
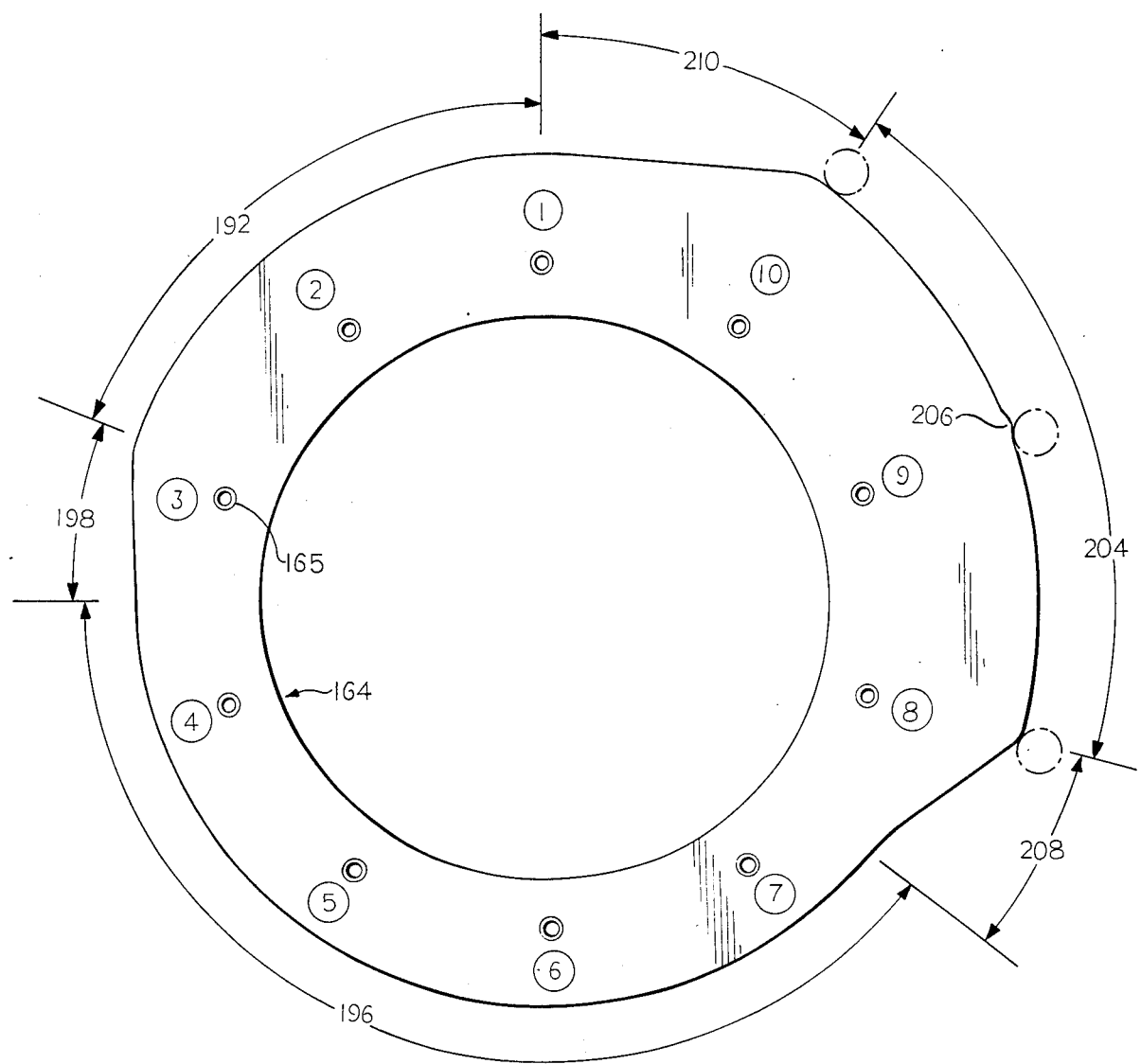
FIG. 6 is an enlarged plan view of a cam which in cooperation with followers, shifts the position of the vacuum heads.

As each vacuum head assembly 50 is moved by the turret into the load station and through the immediately succeeding station no. 2 and a portion of station no. 3, the cam 164 bears on the follower 166 and moves it to the position 188 shown in phantom in FIG. 5. In this position, the axis 190 of an article 34 engaged by the vacuum head is inclined to a horizontal position at an acute included angle of 30° or to the axis of rotation of the table 54 at an acute included angle of 60°. This is accomplished by engagement of the follower with the peripheral face of the portion 192 (FIG. 6) of the cam 164 which spans an arc of about 65°.

As each head assembly moves into the deflash station 40 and through the idle station no. 5, facing station 42 and inspection station 44, its follower is in the position shown in solid line in FIG. 5 so that the axis 194 of the articles engaged by the head extends essentially horizontally or perpendicular to the axis of rotation of the table 54. This is accomplished by disengagement of the follower 166 of each head assembly from the cam 164 as it is moved around the portion 196 of the cam which spans an arc of about 145°. When the follower of a head assembly is disengaged from the cam, the follower is positively located in this horizontal position by engagement of the pivot block 154 with a positive stop 197 (FIG. 5) secured to the table 54. As each head assembly moves through a portion of the third station, the axis of the articles it engages is moved from the inclined to the horizontal position. This is accomplished by engagement of the follower 166 of the head with the transitional portion 198 of the cam which spans an arc of about 25°.

As each head assembly moves through the rejection and unloading stations 46 and 48 and preferably at least most of the immediately succeeding station no. 10, the cam 164 has moved the follower 166 into the position 200 shown in phantom in FIG. 5. In this position, the axis 202 of the articles carried by the head assembly extends essentially vertically or parallel to the axis of rotation of the table 54. This is accomplished by engagement of the follower 166 with the periphery of the portion 204 of the cam 164 which spans an arc of about 75°. To ensure that in the unload station 48 the turntable 54 does not overshoot or rotate beyond the desired angular or circumferential position for release of the articles, preferably a relatively small protusion 206 is provided in the portion 204 of the cam which cooperates with the follower of the head to yieldably retard rotation of the turntable. Between the inspection and release stations 44 and 46, the articles are moved from the inclined to the vertical position by engagement of the follower of their associated head with the peripheral face of a transitional portion 208 of the cam which spans an arc of about 20°. As each head moves from the station succeeding the unload station toward the load station, it is moved from the vertical to the inclined position for engagement with another article in the load station by engagement of its associated follower with the peripheral face of the transitional portion 210 of the cam which spans an arc of about 35°.

In accordance with another feature of this invention and as will be apparent from FIG. 5, the vacuum head assemblies provide fixed locations in each of the horizontal, inclined, and vertical positions of both the plane of the bottom and the axis of the neck of an article regardless of variations in the size of such article. This greatly facilitates setting up the trimming apparatus as well as the accumulator conveyor and the unloading conveyor for processing runs of articles of differing sizes. Indeed, neither of these conveyors needs to be moved or changed in any way to process runs of articles varying in size within a wide range. Locating the axis of the neck in the fixed horizontal positiont shown in FIG. 5 ensures that it will be aligned with the axis of the cutting tool in the facing station and with the axis of a probe in the inspection station. With some articles the distance between the axis of the neck and the sidewall may be so great that it is necessary to utilize different carrier plates 152 in order to locate the axis of the neck so that in the horizontal position it will be allinged in the facing station with the axis of a cutting tool and in the inspection station with the axis of a probe.

LOAD STATION

Figure 7:
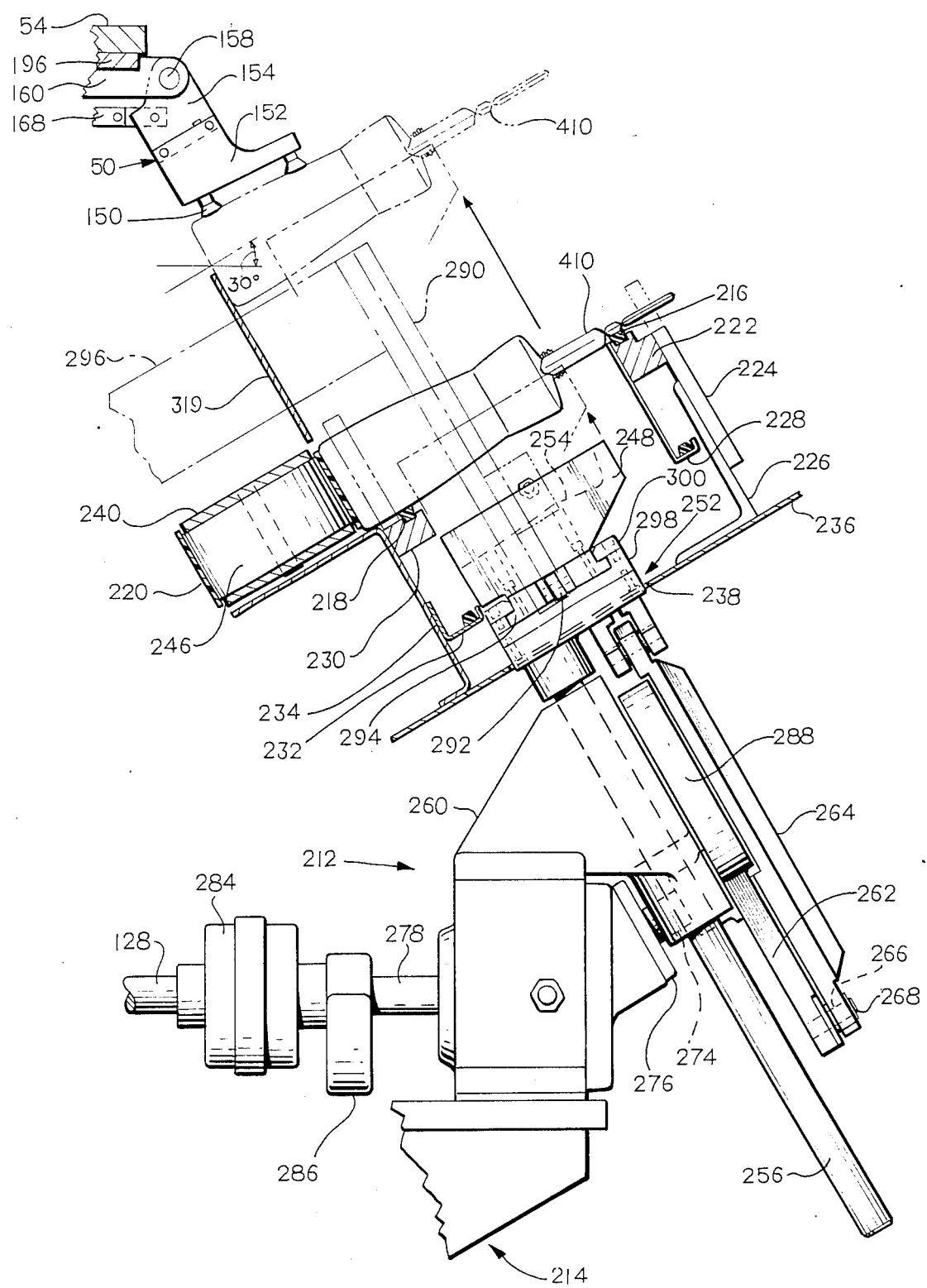
FIG. 7 is a fragmentary sectional view taken generally on line 7—7 of FIG. 1 and illustrating an article pickup and transfer mechanism in a loading station of the apparatus of FIG. 1.
Figure 8:
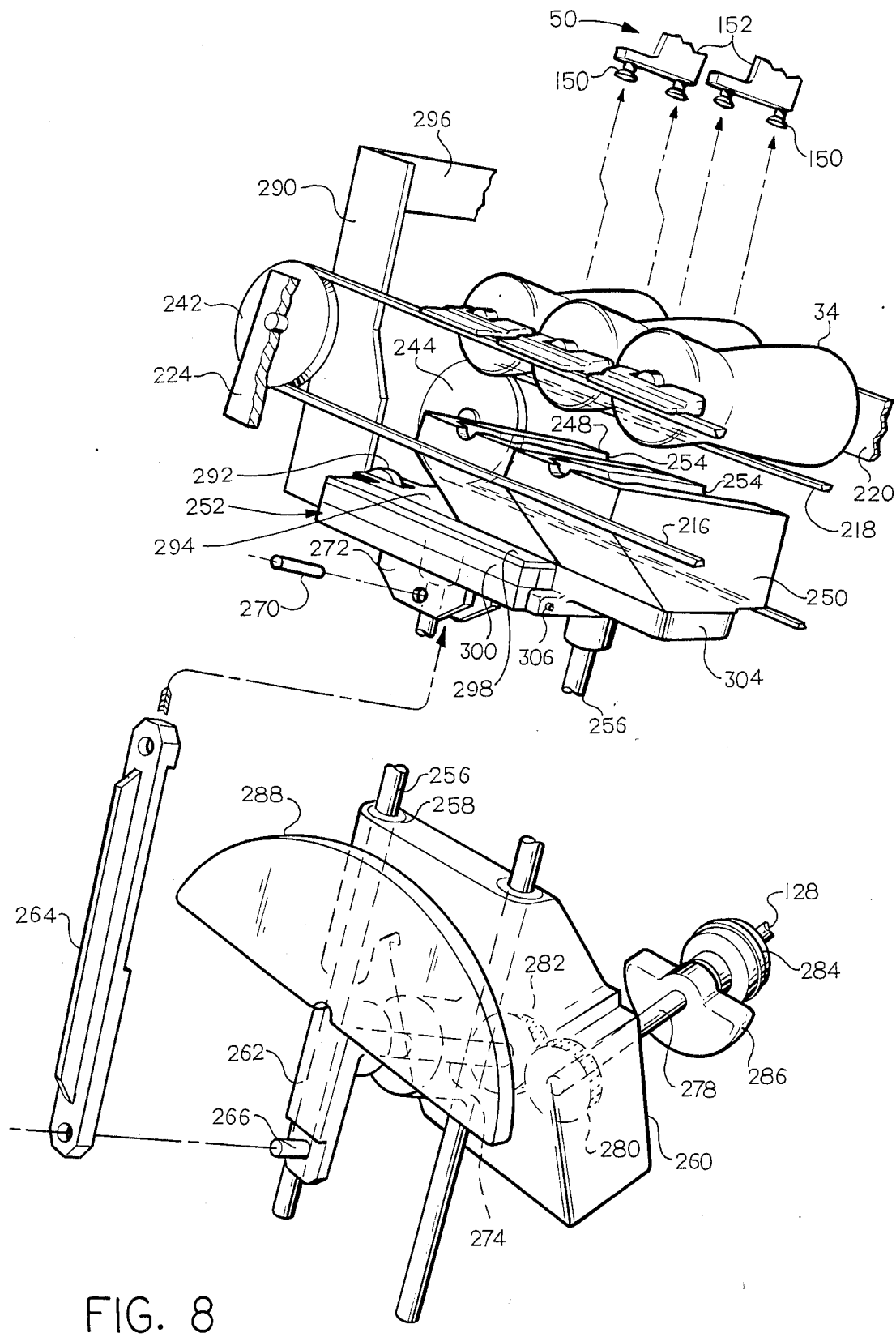
FIG. 8 is a fragmentary perspective view of the pickup and transfer mechanism and the accumulator from which it transfers articles to the trimming apparatus.
Figure 9:
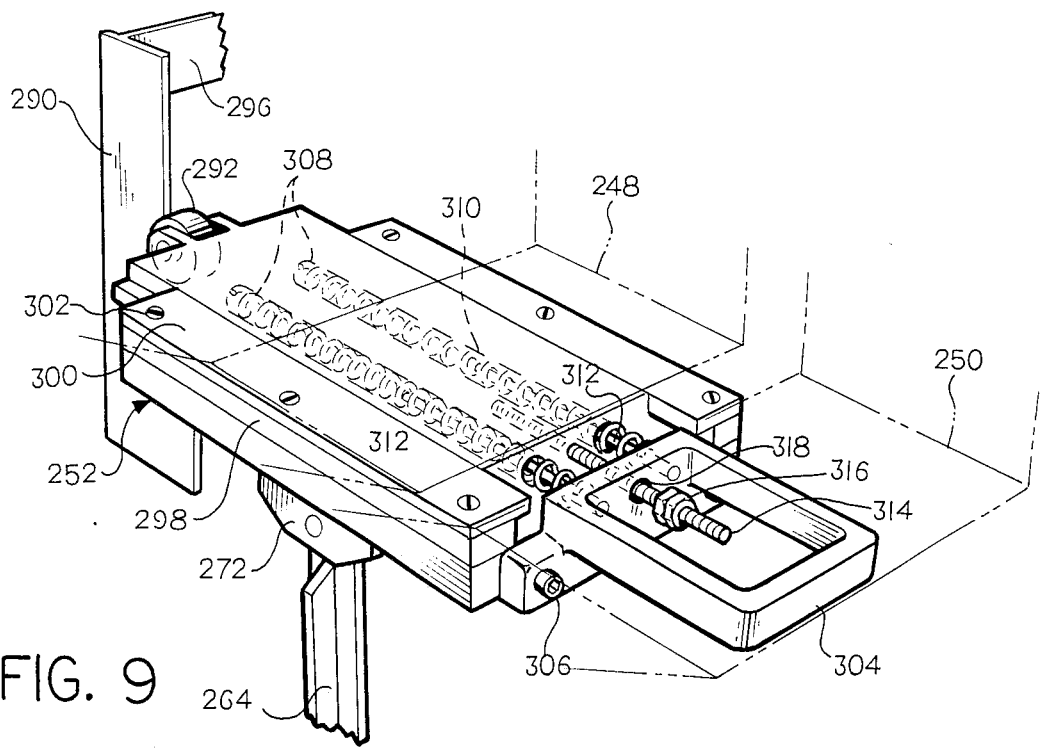
FIGS. 9 and 10 are fragmentary perspective views of a portion of the transfer mechanism of FIG. 8.
Figure 10:
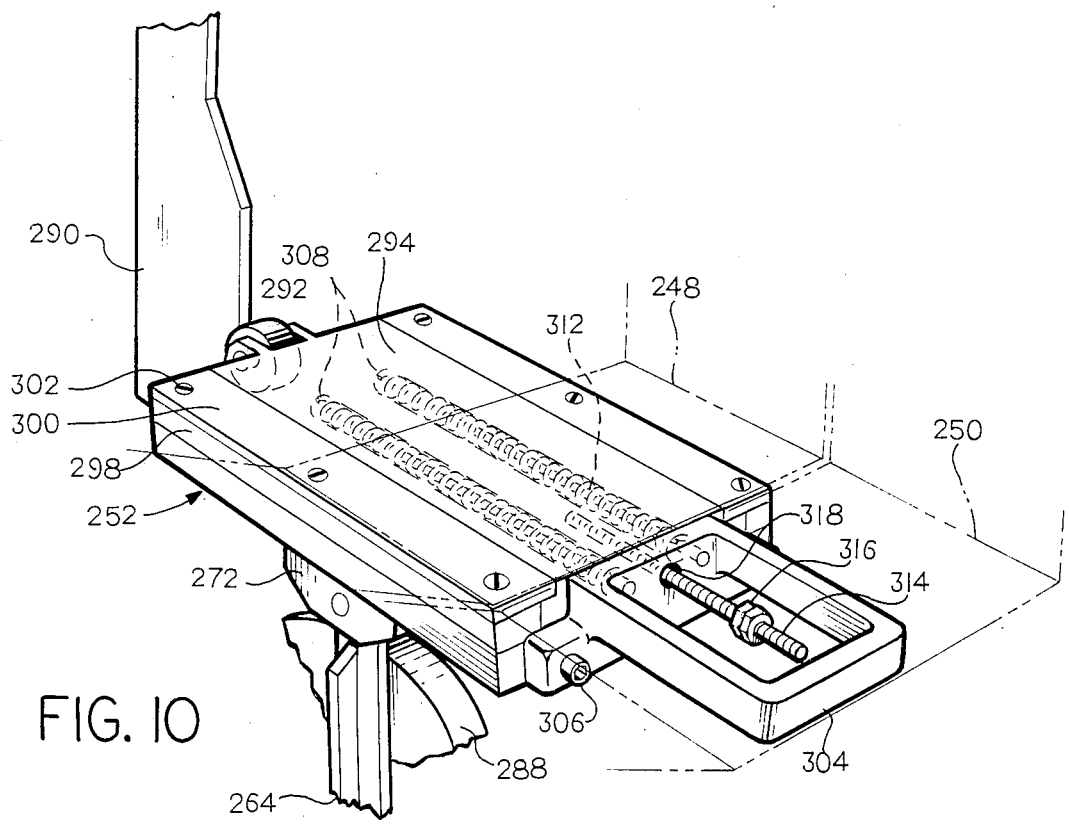

In accordance with this invention, in the load station 38, articles 34 are lifted from the accumulator conveyor 32 and presented for pickup and engagement by a vacuum head 50 by a transfer mechanism 212 (FIGS. 7 and 8) mounted on a station base 214 secured to the base 62 of the trimming apparatus. In the accumulator conveyor, the articles 34 bear on and are moved in side by side relation by three belts 216, 218 and 220 which travel at the same linear speed. In accordance with this invention, to ensure that the bottom of the articles 34 firmly engage the belt 220 so that they will be moved along the conveyor 32, it is inclined at an acute included angle to the horizontal of 30°. The upper run of the belt 216 is supported by an underlying rail 222 fixed to a side plate 224 secured to a angle iron member 226 fixed to the frame (not shown) of the conveyor. The lower run of the belt is supported by a sheet metal trough 226 fixed to the rail 222.

Similarly, the upper and lower runs of the belt 218 are supported by a rail 230 and a sheet metal trough 232. A sheet metal side cover 234 is fixed to the rail 230 and the trough 232. A bottom 236 is fixed to both the side cover and the bracket 226 and has an opening 238 through which the transfer mechanism extends. The flat belt 220 is shielded by a pair of side plates 240 fixed to the conveyor. The belts extend beyond the transfer mechanism and are received on idler pulleys 242, 244 and 246.

To move two articles 34 at a time from the accumulator conveyor into engagement with a pickup head 50, a pair of nests 248 and 250 carried by a table 252 are raised by the transfer mechanism 212. To accurately locate articles in the nests, each nest has a cavity 254 with a contour conforming to a side wall and shoulder portion of an article. Table 252 is secured to one end of a pair of support rods 256 each slidably received in a bushing 258 in a housing 260 of the transfer mechanism secured to the station base 214.

The table is raised and lowered by rotation of a crank arm 262 connected to the table by a link 264. The link is pivotally connected to the crank arm by a pin 266 and a retaining washer 268 and to the table by a pin 270 secured to spaced apart brackets 272 fixed to the table. The crank arm 262 is fixed to one end of a shaft 274 journaled for rotation in a bushing 276 received in the housing 260. An input shaft 278 is journaled in the housing and has a bevel gear 280 fixed to one end which meshes with a bevel gear 282 fixed to the crank shaft 274. The transfer mechanism is driven by the variable speed motor 110. To drive the transfer mechanism, the input shaft 278 is connected by a coupling 284 to a power takeoff shaft 128 in the load station.

In accordance with another feature of this invention, to provide a smoothly operating transfer mechanism and to minimize variations in the load on the drive shaft 278, counter weights 286 and 288 are secured in angularly opposed relationship on the input shaft 278 and crank 262 respectively. The counter weight 288 is also in angular opposed relationship to the forces created on the crank by the reciprocating table, shafts and nests connected to the link 264.

In accordance with this invention, to facilitate processing of two articles at a time in each station, they are laterally separated after being picked up by the nests and before being engaged by a pickup head 50. After a pair of abutting articles 34 are received in the nests 248 and 250, and preferably after being lifted from the belts, the nest 248 is moved away from the nest 250 to laterally space apart the articles received in the nests. As shown in FIGS. 7–10, the nest 248 is moved by the cooperation of a cam 290 and a follower 292 mounted on a slide 294 to which the nest 248 is secured. The cam is fixed to a support bracket 296 secured to the accumulator conveyor 32. The slide 294 is mounted for reciprocation on the table 252 by a pair of ways 298 and keepers 300 secured to the table by screws 302. The nest 250 is fastened to a support bracket 304 secured by cap screws 306 to one end of the table 252.

The follower is movably urged into engagement with the cam by a pair of coil springs 308 received in blind bores 310 in the slide with one end bearing on the support bracket 304. To retain the springs in alignment with the support bracket, guide pins 312 are secured to the bracket and project through the springs and into the bores. To prevent the slide from being forced off the table by the springs in the event the follower 292 is disengaged from the cam, such as during installation or service, a threaded rod 314 with jam nuts 316 adjacent one end extends through a bore 318 in the bracket 304 and is threaded into the slide. To ensure that the articles are accurately located for engagement by the heads 50, the bottom of each article bears on a guide and locator plate 319 when the article is raised by the transfer mechanism 212. This locator plate is fixed to the support bracket 296.

DEFLASH STATION

Figure 11:
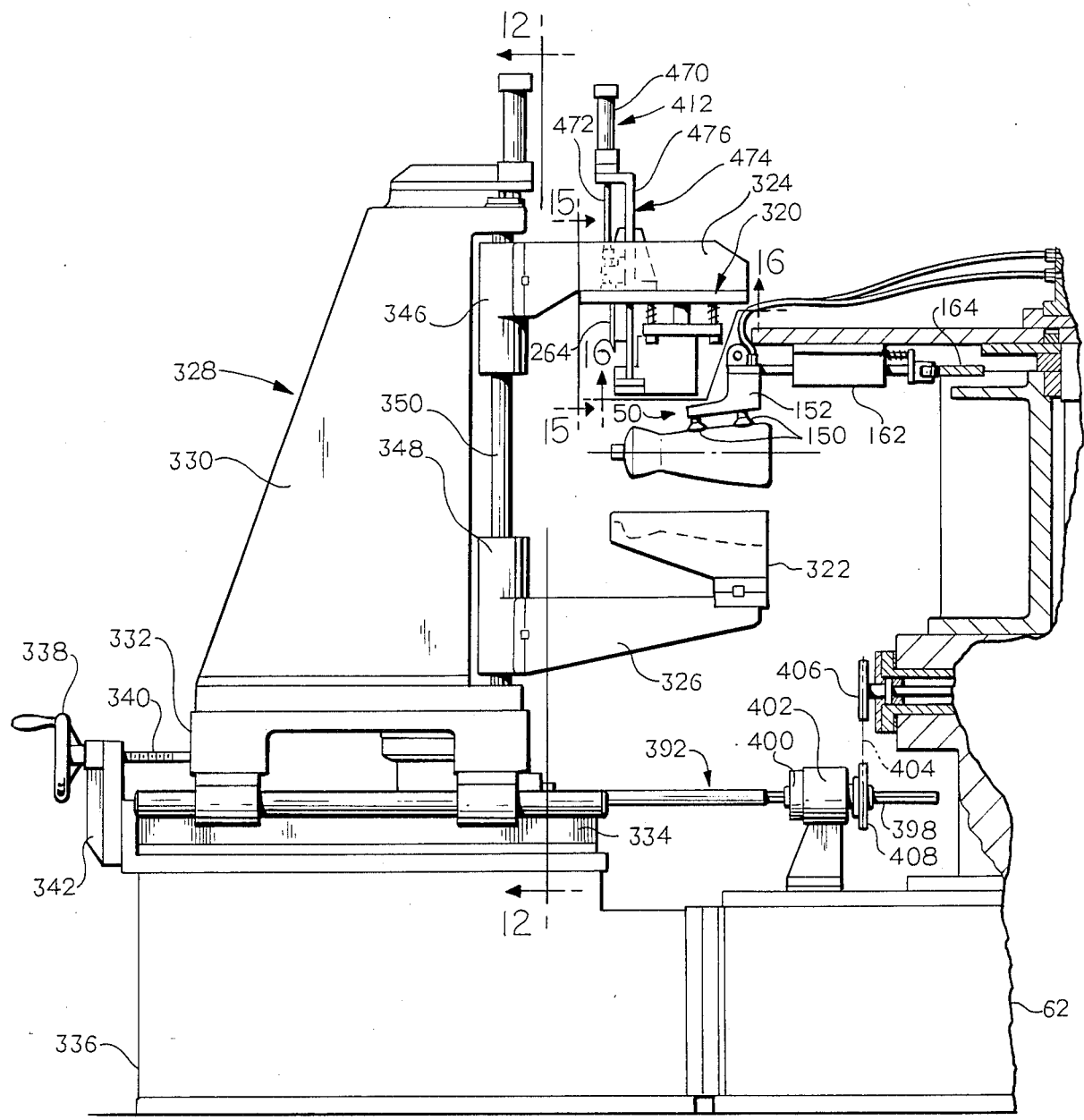
FIG. 11 is a sectional view taken generally on line 11—11 of FIG. 1 and illustrating a press and trimming dies in a deflash station of the trimming apparatus of FIG. 1.
Figure 13:
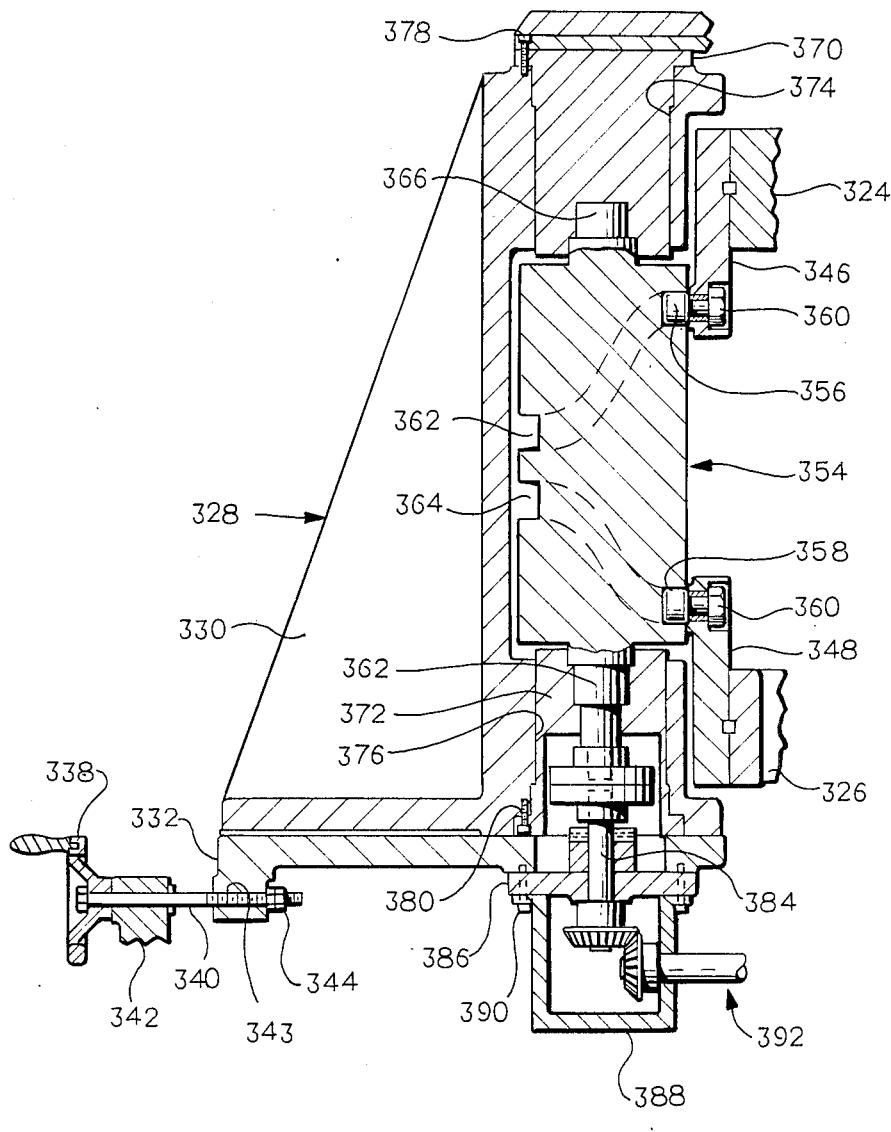
FIG. 13 is a sectional view taken generally on line 13—13 of FIG. 1 and illustrating a drive mechanism of the press.

In accordance with this invention and as shown in FIG. 11, in the deflash station 40 the vacuum heads 50 position a pair of articles 34 between upper and lower dies 320 and 322 carried by platens 324 and 326 of a press 328. The frame 330 of the press is mounted on a table 332 slidably carried by ways 334 fixed to a station base 336 connected to the base 62. To facilitate positioning the press with respect to articles held by the vacuum heads 50, the press can easily be moved by turning the hand wheel 338 which rotates a threaded shaft 340 to move the table on the ways. As shown in FIGS. 11 and 13, the shaft is journaled and captured in a bracket 342 fixed to the station base 336 and has a threaded portion received in a complementary threaded bore 343 through a lip of the table with jam nuts 344 on its free end.

Figure 12:
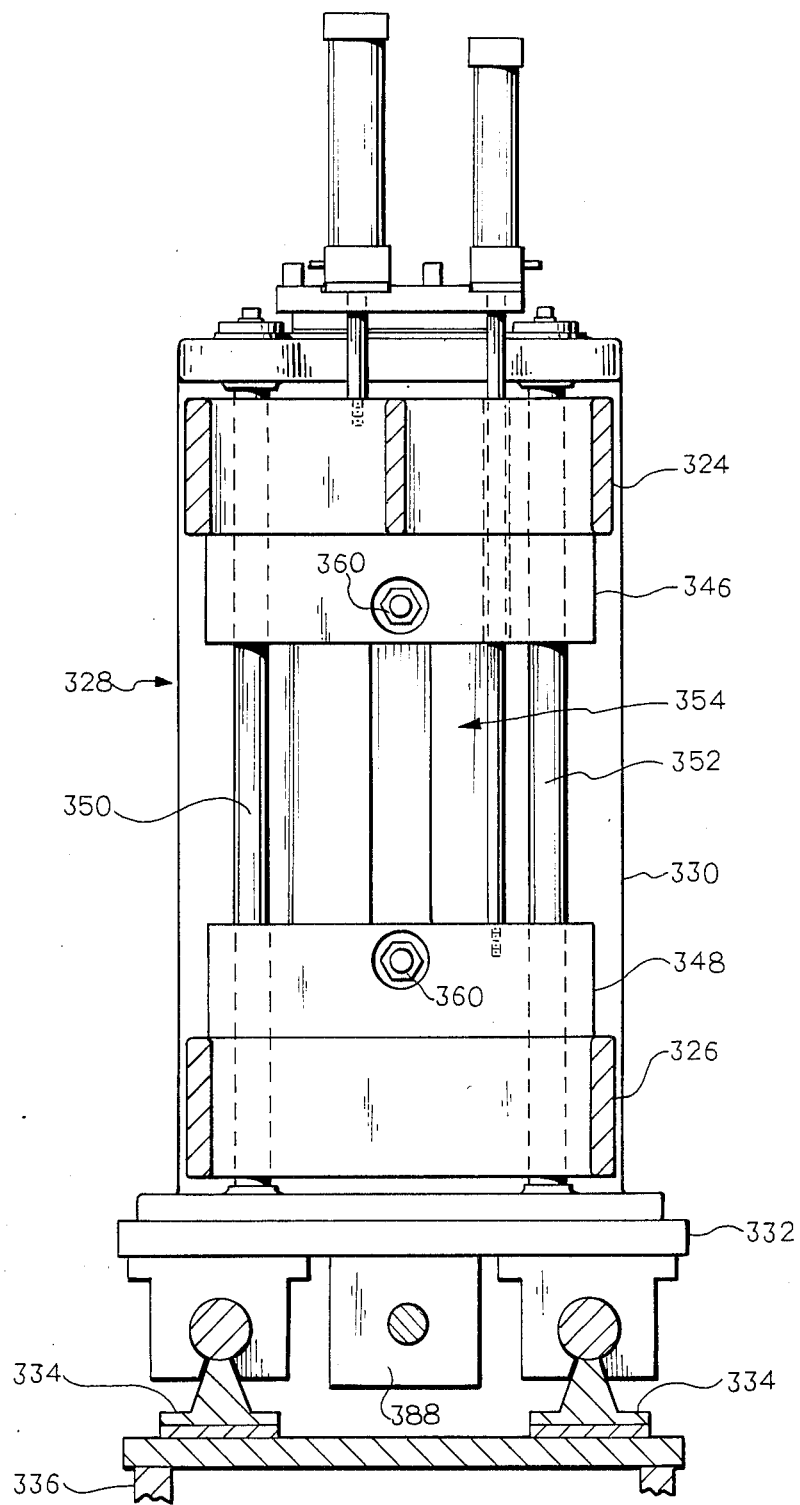
FIG. 12 is a sectional view taken generally on line 12—12 of FIG. 11 and illustrating a portion of the press.

As shown in FIGS. 11 and 12, the platens 324 and 326 of the press are secured to slides 246 and 248 journaled to slide on supporting shafts 350 and 352 secured to the frame of the press. As shown in FIG. 13, the slides are reciprocated away and toward each other to open and close the trimming dies by the cooperation of a barrel cam 354 and followers 356 and 358 secured by nuts 360 to the slides. The followers are received in tracks 362 and 364 in the barrel cam which preferably have dwell sections in both the fully closed and fully opened positions of the dies. The barrel cam has stub shafts 366 and 368 journaled for rotation in a bearing block 370 and a bushing 372 respectively which are received in counterbores 374 and 376 in the frame and secured by cap screws 378 and 380.

To enable the cycle time of the apparatus to be easily adjusted, the barrel cam 354 is driven to open and close the trimming dies by the variable speed electric motor 110. To facilitate removing the press 328 from the table 332, the barrel cam 354 is connected by a coupler 382 fixed to one end of a shaft 384 journaled in a bearing plate 386 secured along with a cover housing 388 to the table by cap screws 390. The shaft 384 is coupled to a shaft 392 by a pair of meshed bevel gears 394 and 396 fixed to adjacent ends of the shafts. The shaft 392 is journaled in the housing 388.

To couple the press to the drive motor 110 while still permitting the press to be moved by the table, as shown in FIG. 11 the other end of the shaft 392 has a spline portion 398 which extends through and can slide back and forth in a complementary sleeve 400 captured and journaled for rotation in a support housing 402 fixed to the base 62. The sleeve 400 is coupled to the power takeoff shaft 128 in the station by a drive chain 404 received on a pair of sprockets 406 and 408 fixed to the takeoff shaft and the sleeve.

Figure 14:
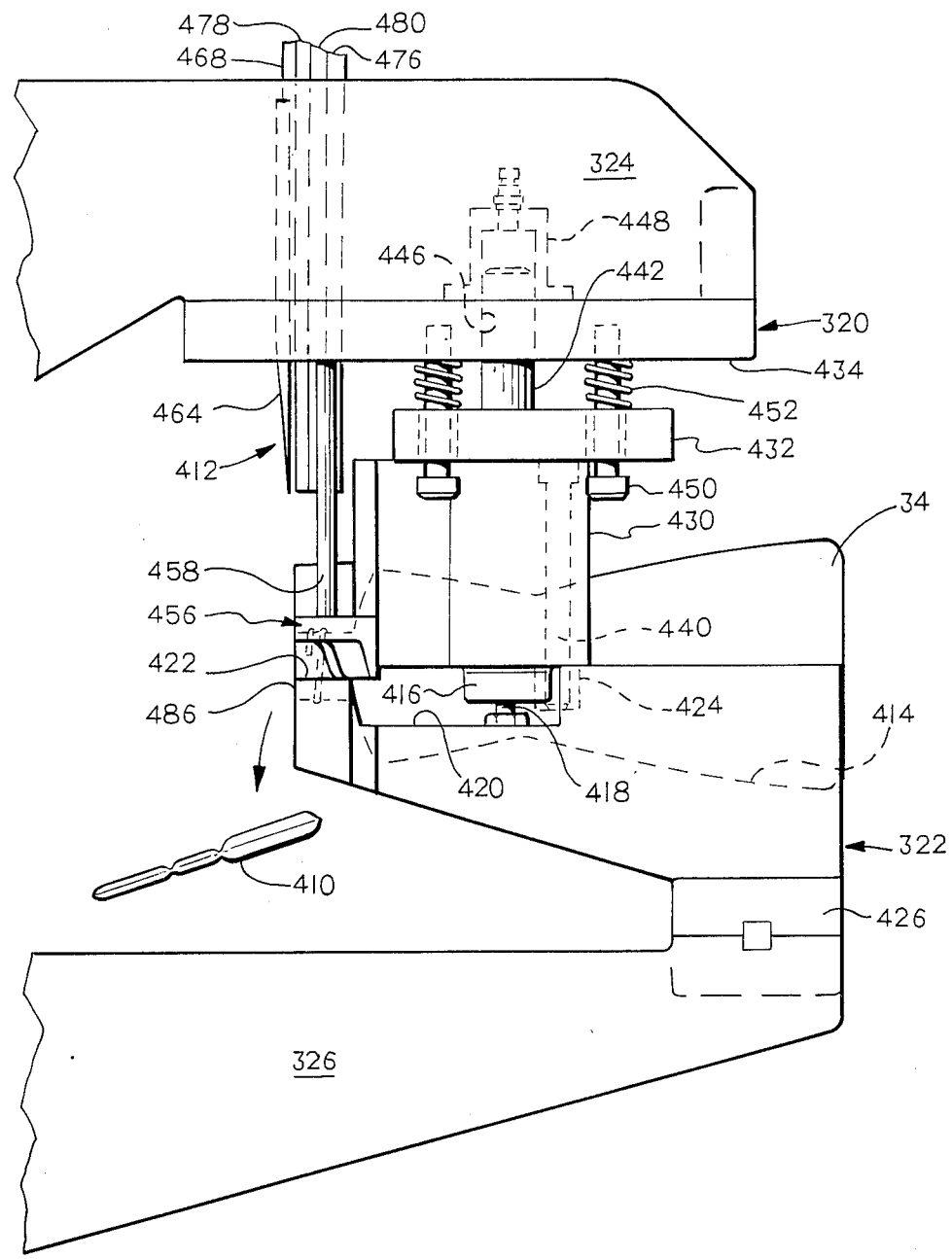
FIG. 14 is an enlarged fragmentary side view of the trimming dies shown in their closed position in the press of the deflash station.

As shown in FIG. 14, flash 410 is removed from the articles 34 when the trimming dies 320 and 322 are fully closed by the press 328 and finish trimmers 412 are actuated. To receive and accurately locate a pair of articles, the lower die has two laterally spaced apart cavities 414 each having a contour conforming with the configuration of a lower portion of the shoulder and side wall of the article to be trimmed. To cushion the closing of the dies a pair of adjustable rubber bumpers 416 (only one of which is shown) with mounting studs 418 are each received and threaded in a separate recess 420 in the lower die. To shear the portion of the flash adjacent the neck and shoulder areas of each article, a die insert 422 is provided adjacent the nose of each lower die 322 which is complimentary to and cooperates with trimming punches or elements in the upper die 320. To provind a proper shearing action there is a slight clearance between the insert and its associated trimming elements. To receive locator pins in the upper die, a pair of laterally spaced bushings 424 are fixed in the lower die. The lower die is secured to a bolster plate 426 which is keyed and secured to the lower platen 326 of the press.

Figures 15, 16:
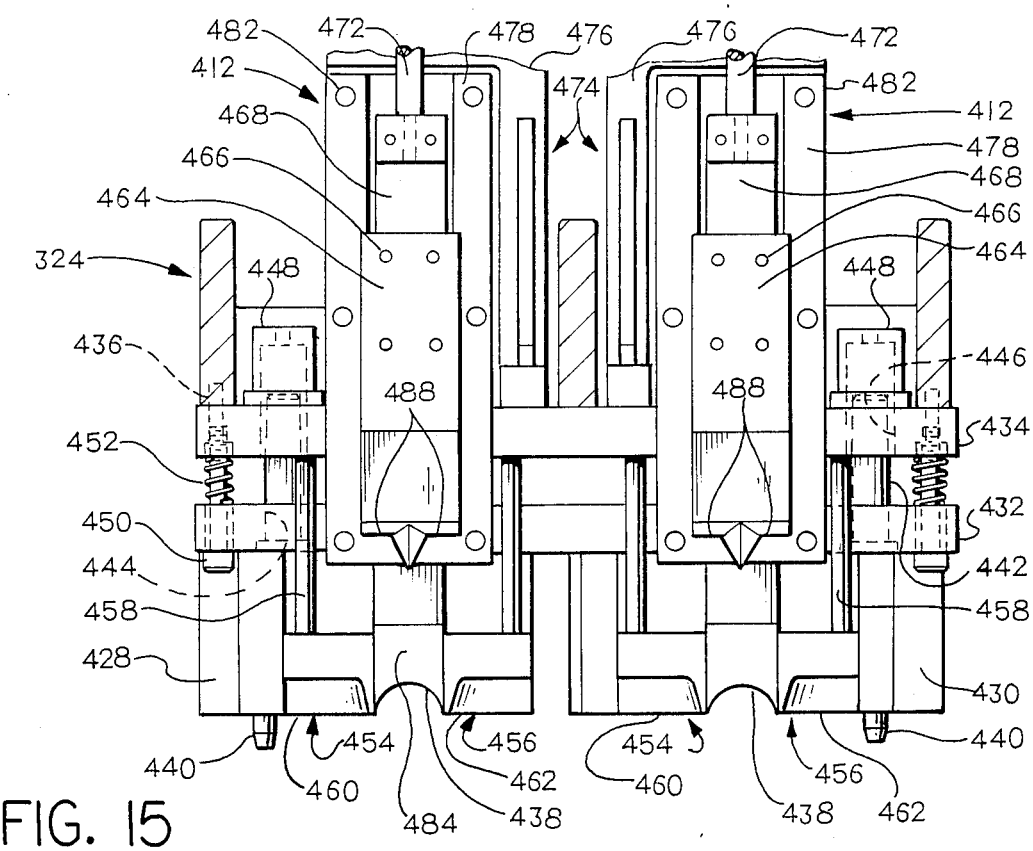
FIG. 15 is a fragmentary and sectional view taken generally on line 15—15 of FIG. 11 and illustrating a portion of the upper trimming die.
FIG. 16 is a view of the upper trimming die taken generally on line 16—16 of FIG. 11.

As shown in FIGS. 14 and 15, to firmly clamp the articles between the dies, the upper die has a pair of clamp members 428 and 430 secured to a pressure pad 413 carried by a bolster plate 434 secured by cap screws 436 to the upper platen 324 of the press. To firmly engage and accurately locate the articles, each clamp member has a cavity 438 conforming to the configuration and contour of a portion of the neck, shoulder and sidewall areas of the articles to be trimmed. As the upper and lower dies close they are accurately located relative to each other by locator pins 440 which are fixed to the clamp members and enter the bushings 424 in the lower die.

The pressure plate 432 is accurately located and guided for movement relative to the bolster 434 by a pair of guide pins 442 each having one end captured in a counterbore 444 in the pressure plate and the other end passing through a bore 446 in the bolster and slidably received in a collet 448 fixed to the bolster. Movement of the pressure pad away from the bolster is limited by caps screws 450 which extend through holes in the pressure pad and are threaded into the bolster. The pressure pad is yieldably biased away from the bolster by springs 452 received over the cap screws.

As the dies become completely closed, the portion of the flash in the shoulder and neck areas of the articles is severed by trimming elements 454 and 456 in the upper die each fixed to one end of a support pin 458 with its other end fixed to the bolster 434. The trimming elements 454 and 456 each have cutting edges 460 and 462 respectively which cooperate with the anvil face 422 in the lower die to sever the flash in the shoulder and neck areas of the articles being trimmed.

Flash is severed from the finish or free end of the neck of each article to thereby remove the entire piece of flash 410 from each article, by cycling each finish trimmer 412 after the dies have been completely closed to accurately locate and hold the articles and sever the portion of the flash in the shoulder and threaded area of the neck of each article. As shown in FIGS. 14 and 15, flash is severed from the finish by a guillotine blade 464 secured by screws 466 to a slide 468 actuated by a pneumatic cylinder 470 with an actuator rod 474 secured to the slide. The cylinder is mounted on the upper end of a frame 474 secured at its lower end to the bolster 434 of the upper die. The slide is mounted for reciprocation on an upright carrier plate 476 of the frame by keepers 478 and ways 480 secured by cap screws 482 to the carrier plate. To insure a clean cut, when the quillotine blade 468 is actuated the article is firmly held with its neck fully supported by the closed dies and the back face of the guillotine blade 468 is urged into and slides across the end faces 484 and 486 of the upper and lower dies. The back face of the blade is urged into sliding engagement with these die faces by the force produced by the chisel cutting edges 488 of the blade.

As shown in FIG. 1, when severed from the article, the flash 410 falls onto and slides through an inclined chute 490 and then drops onto a power conveyor 492 which carries it away.

FACING STATION

Figure 17:
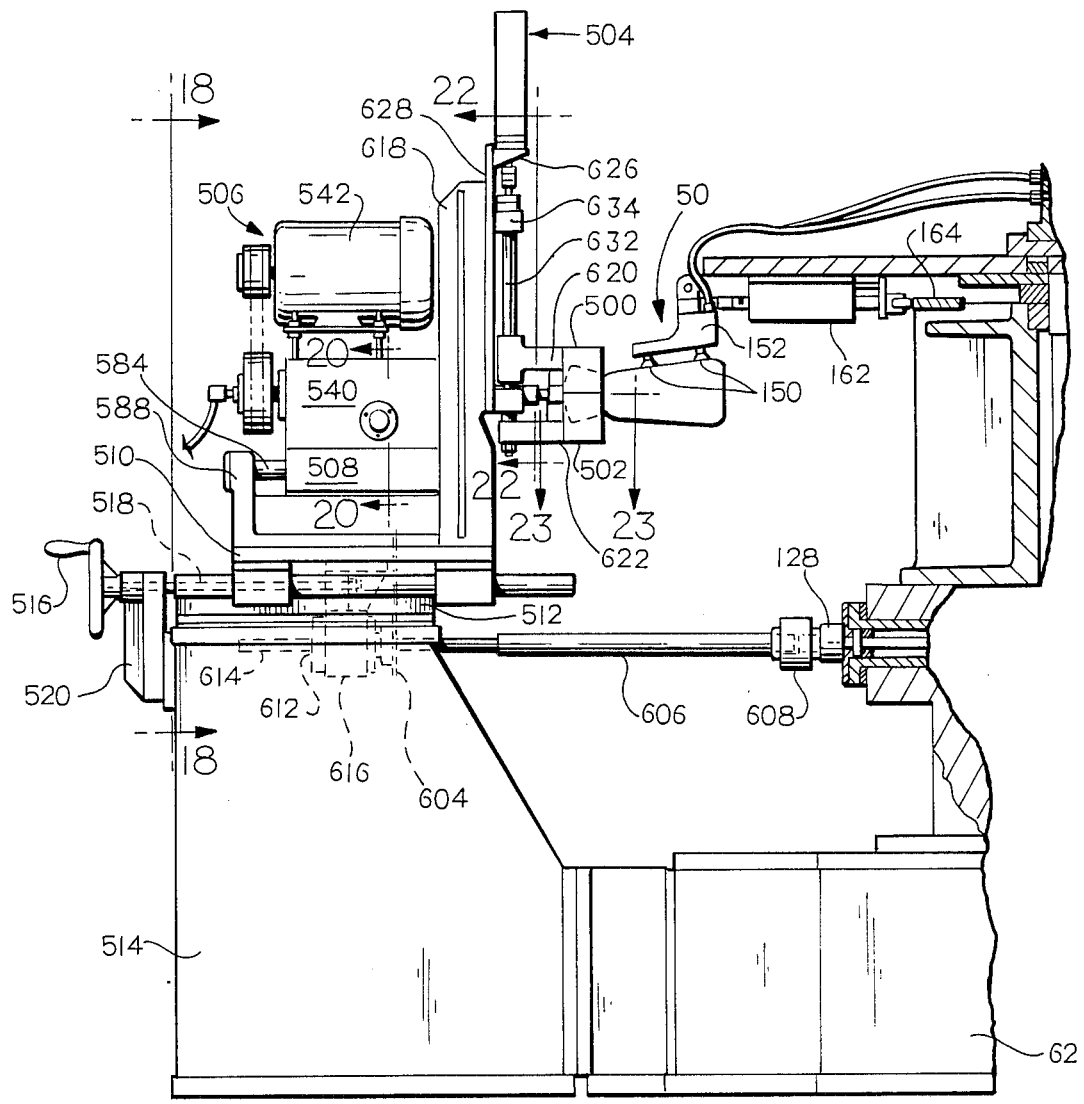
FIG. 17 is a fragmentary sectional view taken generally on line 17—17 of FIG. 1 and illustrating a facer mechanism and article clamping fixture in a facing station of the trimming apparatus.
Figure 18:
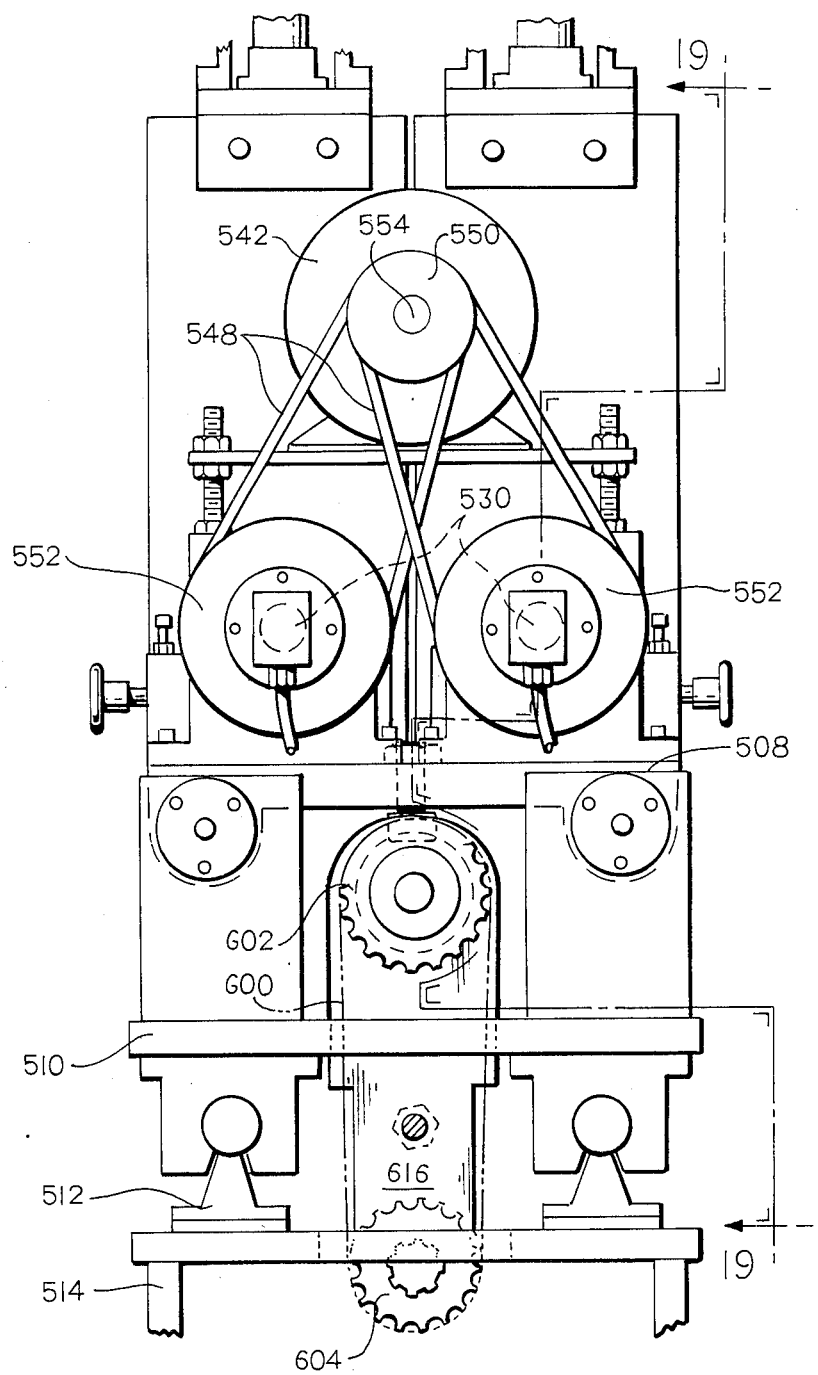
FIG. 18 is a fragmentary back view of the facer mechanism which is taken generally on line 18—18 of FIG. 17.
Figure 19:
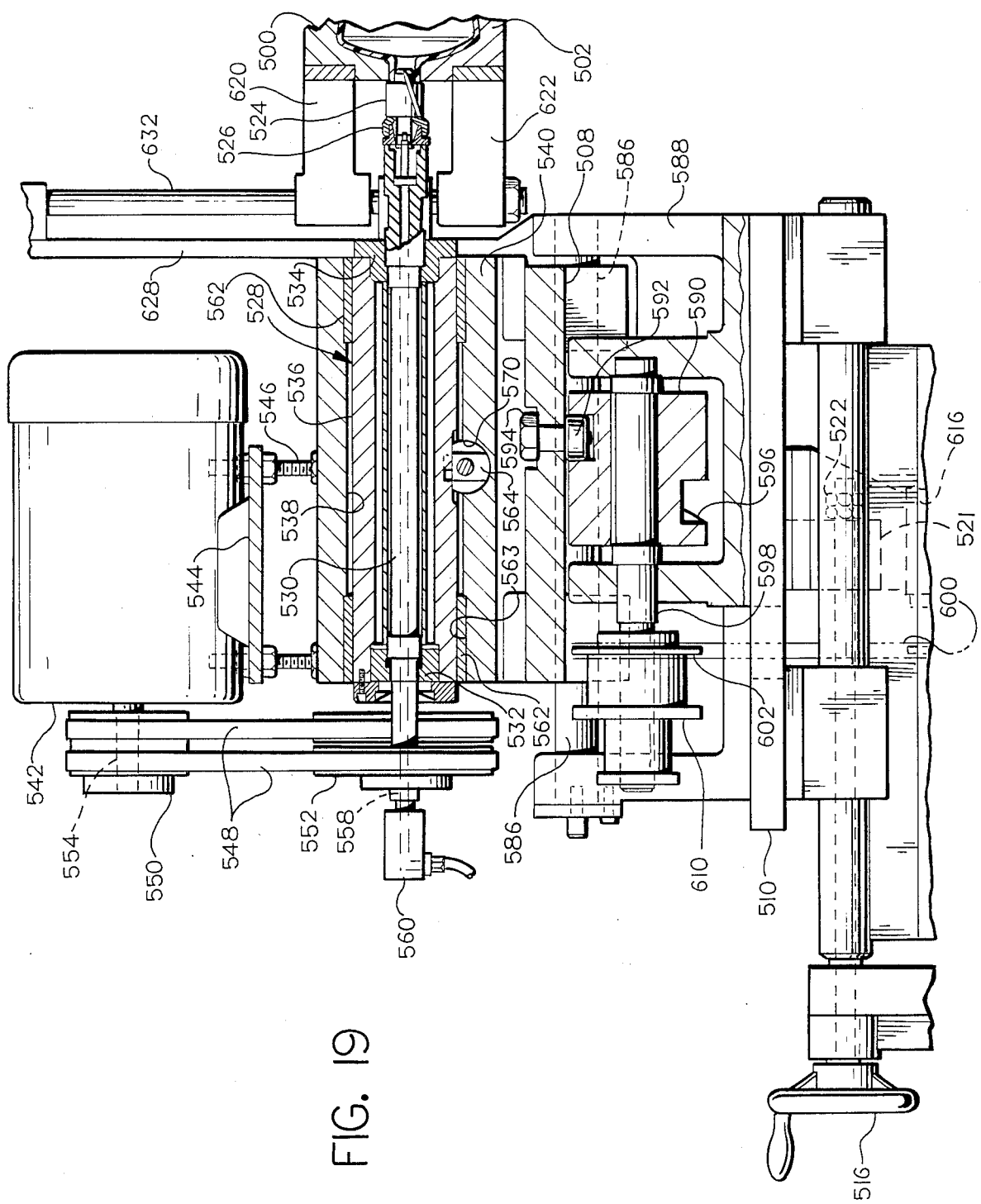
FIG. 19 is a fragmentary sectional view taken generally on line 19—19 of FIG. 18 and illustrating portions of the facer mechanism.

In accordance with this invention and as shown in FIG. 17, in the facing station 42 a pair of articles 34 carried by the vacuum heads 50 are clamped between a pair of upper and lower nests 500 and 502 carried by a clamping fixture 504 while the end faces of their finishes are machined by a facing mechanism 506. To advance and retract the facing mechanism with respect to the articles, it is mounted on a carriage 508 which is reciprocated on a table 510. To permit easy adjustment for runs of different size articles, both the carriage of the facing mechanism and the clamping fixture are mounted on the table 510 which is slidably carried by rails 512 fixed to a station base 514 connected to the base 62. To facilitate positioning the clamping fixture and the facing mechanism with respect to articles held by the vacuum heads 50, the table can be easily moved by turning a handwheel 516 which rotates a threaded shaft 518 to move the table on the rails. As shown in FIGS. 17 and 19, the shaft is journaled and captured in a bracket 520 fixed to the base 514 and has a threaded portion received in a complementary threaded bore 521 in the table with jam nuts 522 on its free end.

In accordance with this invention, the end faces of two articles are machined at the same time by two separate cutting tools 524 each carried by a separate spindle 526 driven by a separate quill assembly 528 of the facing mechanism. Since the quill assemblies are identical only one will be described in detail. As shown in FIG. 19, each quill assembly has a tool drive shaft 530 journaled in bearings 532 and 534 mounted in a sleeve 536 received in a bore 538 through a housing 540 secured to the carriage. Each drive shaft 530 is driven by an electric motor 542 mounted on top of the housing by a mounting plate 544 and threaded studs 546. Each drive shaft is coupled to the motor by a vee belt 548 received on a pair of vee pulleys 550 and 552 secured to the drive shaft and the output shaft 554 of the motor. The vee belts permit each quill to be shifted axially kwith respect to the housing while still driving thle shaft by the electric motor.

Preferably, to prevent chips of cut material from entering the article, compressed air is blown into the interior of the article and hence out through its neck while it is being machined. The compressed air enters the article through a passage (not shown) in the cutting tool. The compressed air is supplied to the tool through a passage 558 in the drive shaft. This passage is coupled to a source of compressed air (not shown) through a suitable rotary coupler 560 secured to the end of the drive shaft.

To permit the infeed of the cutting tool to be easily adjusted, the sleeve 536 of the quill is slidably received in bushings 562 mounted in counterbores 563 in opposite ends of the housing. As shown in FIGS. 19 and 20, the infeed is adjusted by generally transverse movement of a slide 564 having an integral key 566 received in a complementary slot 568 in the sleeve 536 which is inclined at an acute included angle to the axis of the sleeve. The slide (FIG. 21) has a semi-cylinderical body received in a bore 570 in the housing 540 and is moved therein by turning a shaft 572 threaded in the slide. The shaft is captured and journaled in the bore by covers 574 and 576 secured by cap screws 578 to the housing. The shaft can be releasably locked to prevent it from rotating by a set screw 580 threaded in the cover. To facilitate manually turning the shaft a knurled knob 582 is fixed to its free end.

As shown in FIGS. 17 and 19, the carriage 508 is slidably journaled for reciprocation on laterally spaced apart support shafts 584 and 586 each of which is secured in a generally U-shaped housing 588 fixed to the table. As shown in FIG. 19, the carriage is reciprocated by the cooperation of a barrel cam 590 and a follower 592 secured by a nut 594 to the carriage. The follower is received in a track 596 in the cam which preferably produces a short dwell when the carriage is fully advanced to ensure the cutting tools produce a good surface finish on the machined face of the finish of the articles. The barrel cam is keyed to a shaft 598 journaled for rotation in the housing.

In accordance with this invention, to enable the cycle time of the trimming apparatus to be easily adjusted, the barrel cam 590 is driven to reciprocate the facing mechanism by the variable speed electric motor 110. The barrel cam is coupled to the motor through a drive chain 600 received on a pair of sprockets 602 and 604 and a shaft 606 (FIG. 17) connected by a coupling 608 to the power takeoff shaft 128 in the facing station. As shown in FIG. 19, the sprocket 602 is fixed to a hub 610 keyed to the shaft 598 on which the barrel cam is journaled. To couple the barrel cam to the shaft while still permitting the facing mechanism to be moved by the table, the sprocket 604 is fixed to a sleeve 612 (FIG. 17) having internal flutes complementary to a splined portion 614 of the shaft 606 on which the sleeve is slidably received for rotation therewith. This sleeve is journaled for rotation and captured in a support housing 616 fixed to the table.

Figure 22:
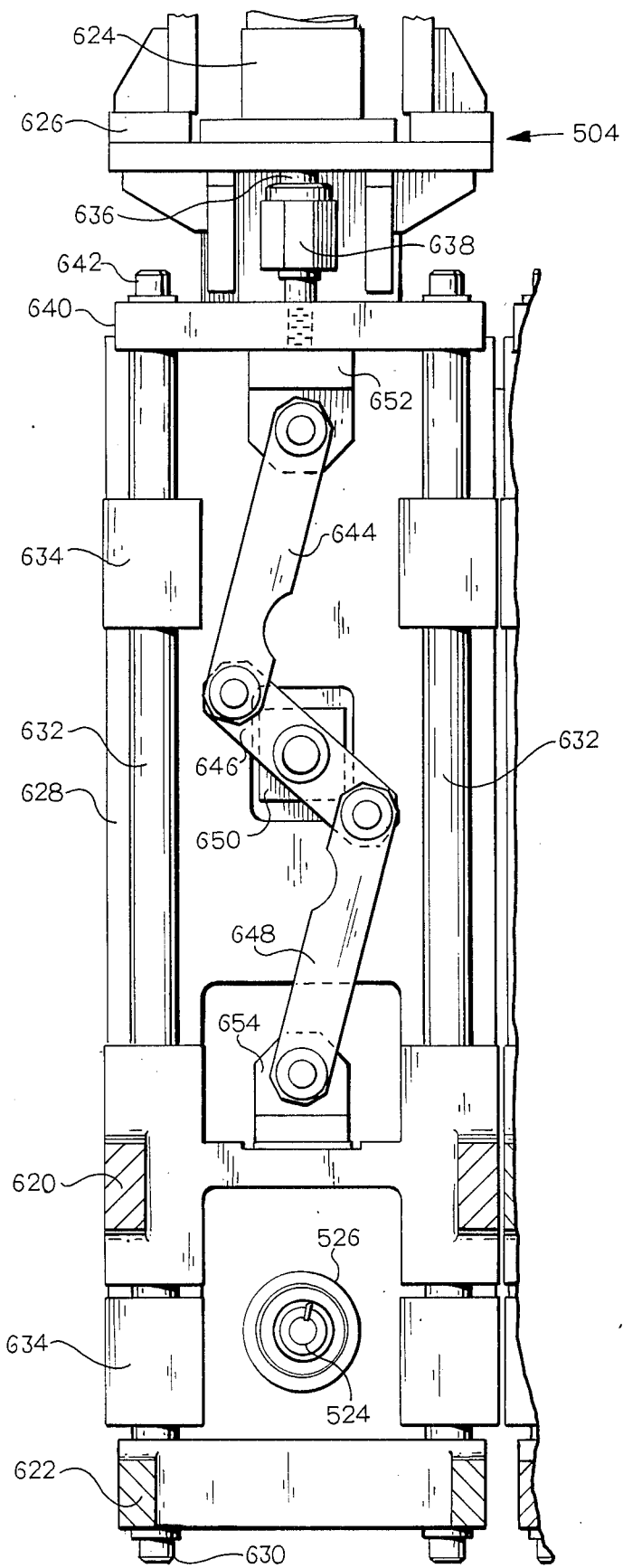
FIG. 22 is a fragmentary sectional view taken generally on line 22—22 of FIG. 17 and illustrating the article clamping fixture.

As shown in FIGS. 17 and 22, a pair of the clamping fixtures 504 are mounted in side by side relation on vertical supports 618 secured to the table. Since the fixtures are identical only one will be described in detail. To open and close the nests 500 and 502, upper and lower platens 620 and 622 of the fixture are moved by a pneumatic cylinder 624 mounted on a bracket 626 fixed to the top of a backing plate 628. The lower platen of each fixture is secured by cap screws 630 to the lower end of a pair of carrier rods 632 slidably received in bearing blocks 634 fixed to the backing plate. The actuator rod 636 of the cylinder is operably connected to the carrier rods by a coupler 638 threaded into a crossbar 640 fixed by cap screws 642 to the upper ends of the rods.

The upper platen 620 is slidably journaled on the carrier rods and operably connected to the cylinder 624 by three links 644, 646 and 648 which cause the upper platen to move in a direction opposite to the direction is which the lower platen is moved by the cylinder. The intermediate link 646 is journaled between its ends on a bearing block 650 fixed to the backing plate. One end of this intermediate link is pivotally connected to one end of the link 644, the other end of which is pivotally connected to a block 652 fixed to the crossbar 640. The other end of the intermediate link 646 is pivotally connected to one end of the link 650, the other end of which is pivotally connected to a block 654 fixed to the upper platen.

As shown in FIG. 23, to facilitate aligning the nests relative to each other, the position of the lower nest 502 can be varied an adjusted laterally. The lower nest is shifted laterally by a bolt 656 which extends through a hole in a bracket 658, bears on the nest, and is captured on the bracket by jam nuts 660. The bracket is secured by cap screws 662 to the lower platen.

INSPECTION STATION

Figure 24:
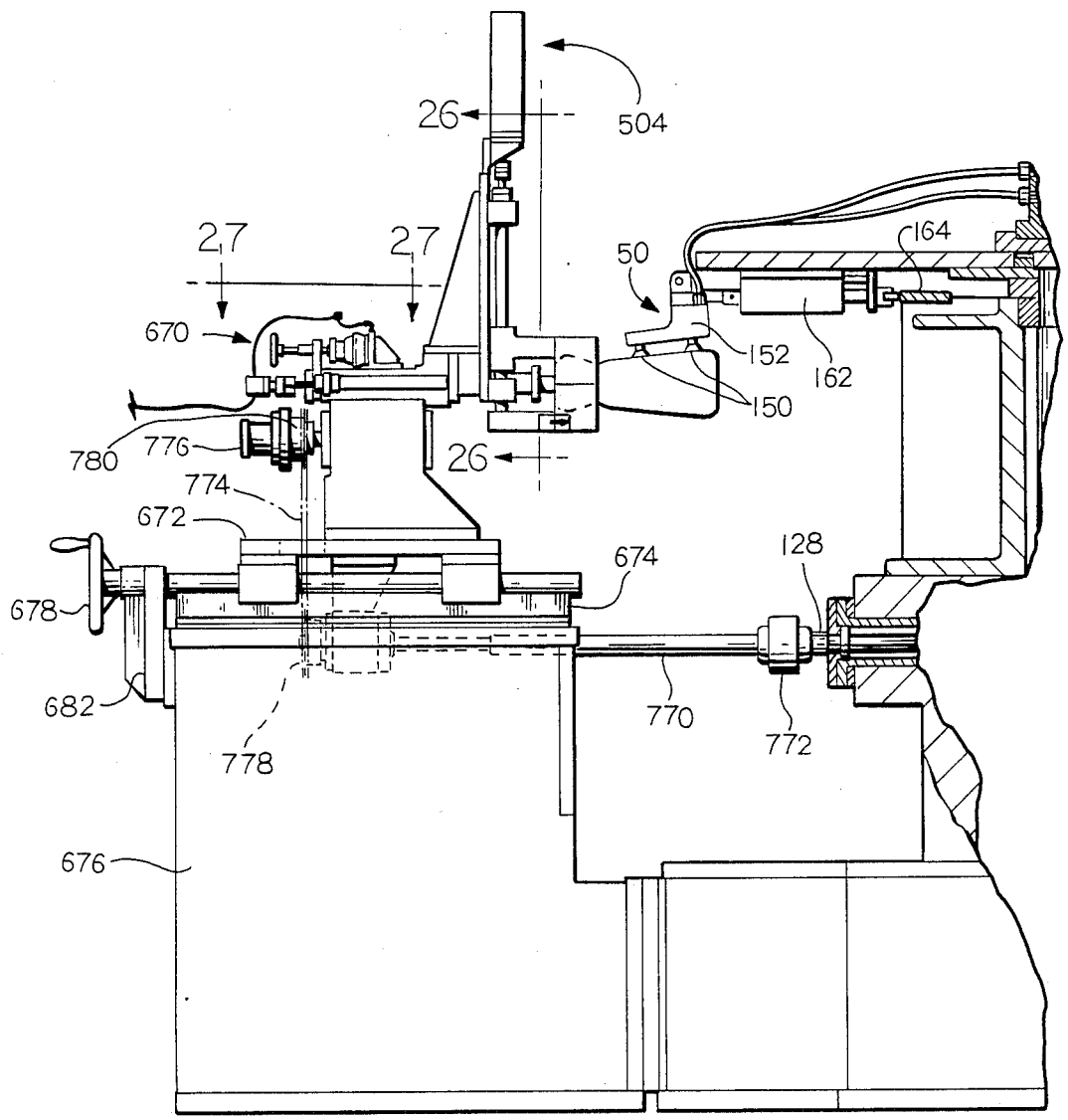
FIG. 24 is a fragmentary side view partially in section taken generally on line 24—24 of FIG. 1 and illustrating an article clamping fixture and a testing assembly in an inspection station of the trimming apparatus on FIG. 1.
Figure 25:
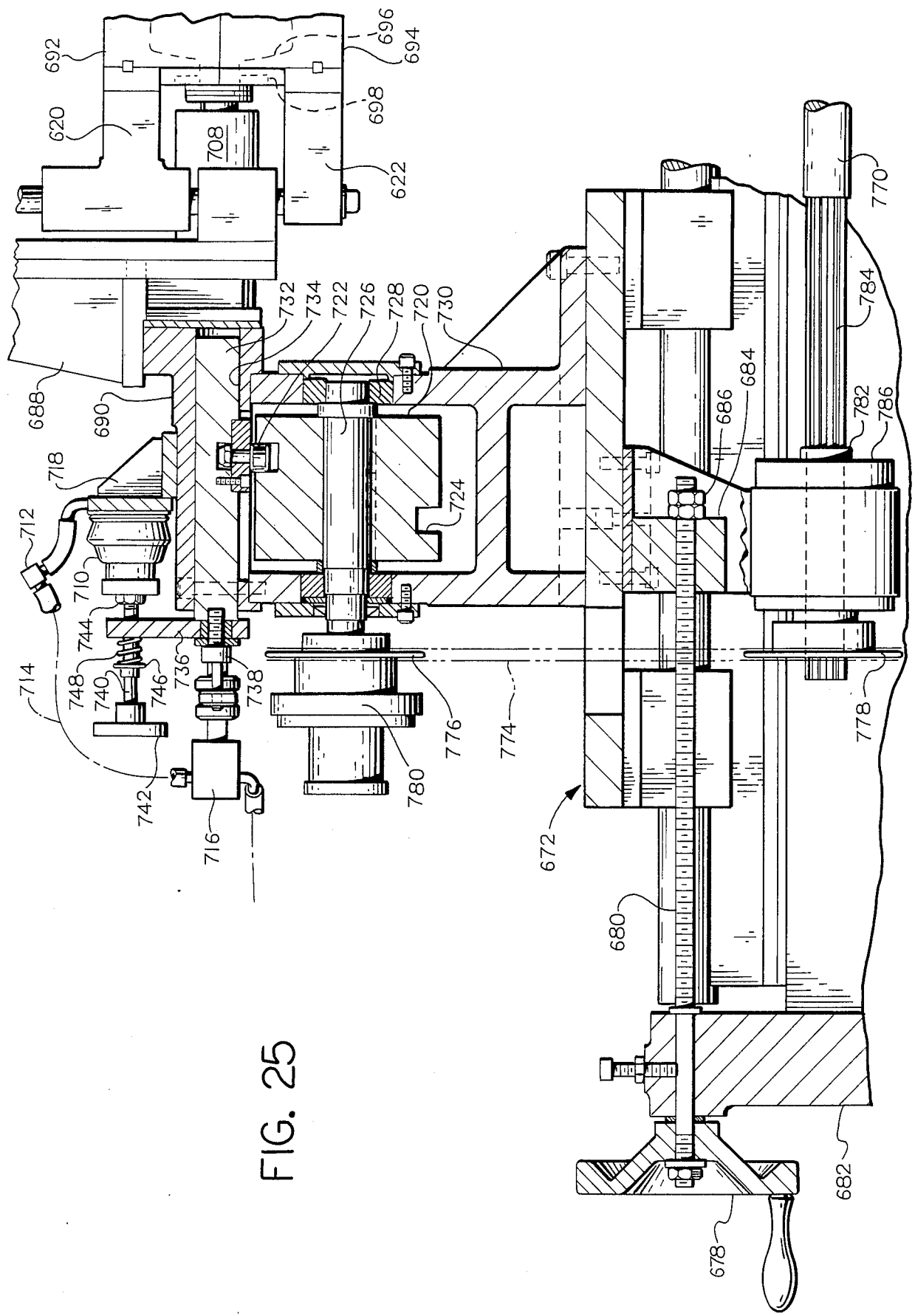
FIG. 25 is a fragmentary sectional view taken generally on line 25—25 of FIG. 1 and illustrating some of the mechanism of the testing assembly.

In accordance with this invention and as shown in FIG. 24, in the inspection station 44 a pair of articles carried by a head 50 are securely held by another pair of clamping fixtures 504 while they are inspected by a test device 670. To enable positioning of the clamping fixtures and the test device for runs of articles of different sizes, they both are carried by a table 672 slidably mounted on a pair of rails 674 fixed to a station base 676 secured to the base 62. This table can be easily moved by turning a handwheel 678 which rotates a threaded shaft 680 to move the table on the rails. As shown in FIGS. 24 and 25, this shaft is journaled and captured in a bracket 682 fixed to the station base and has a threaded portion which extends through a complimentary threaded block 684 fixed to the table. To prevent disengagement of the threaded shaft from the block there are jam nuts 686 on the free end of the shaft.

Figure 26:
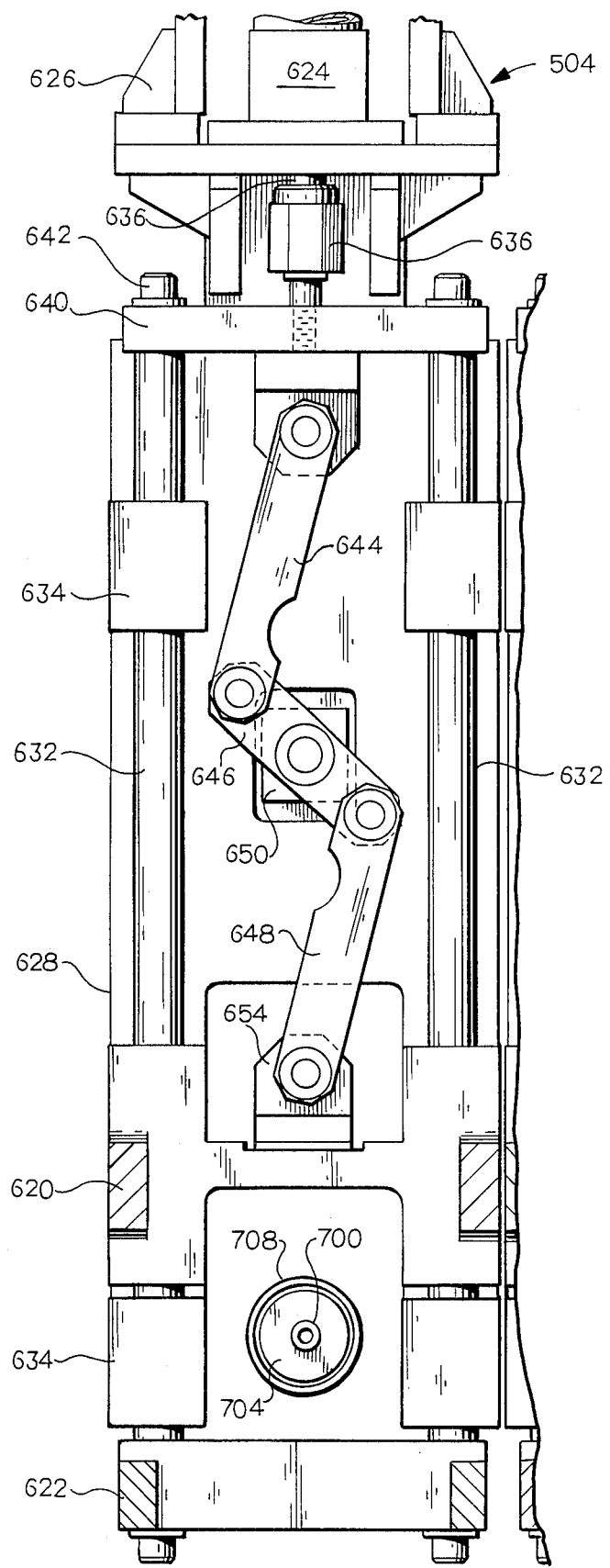
FIG. 26 is a fragmentary sectional view taken generally on line 26—26 of FIG. 24 and illustrating the article clamping fixture.
Figure 28:
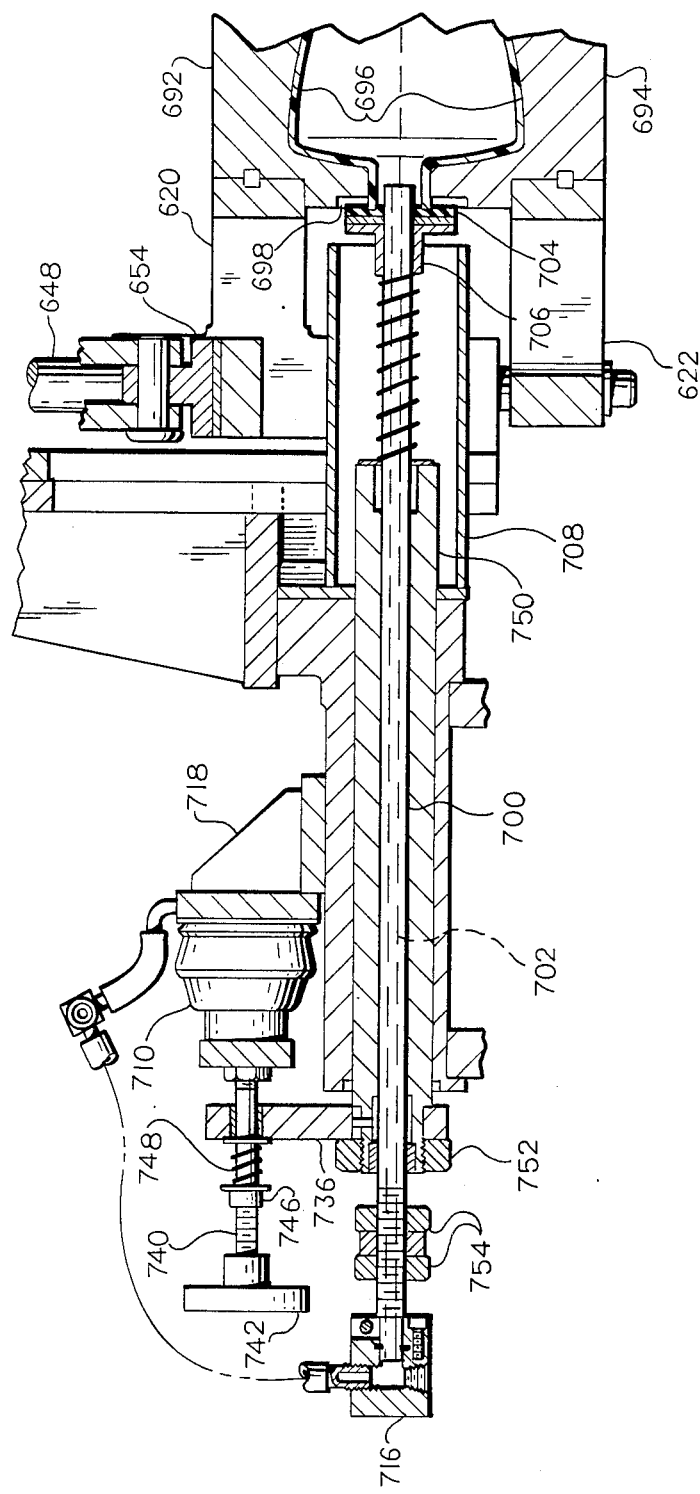
FIG. 28 is an enlarged and fragmentary sectional view taken generally on line 28—28 of FIG. 27 and illustrating some of the mechanism of the testing assembly.
Figure 31:
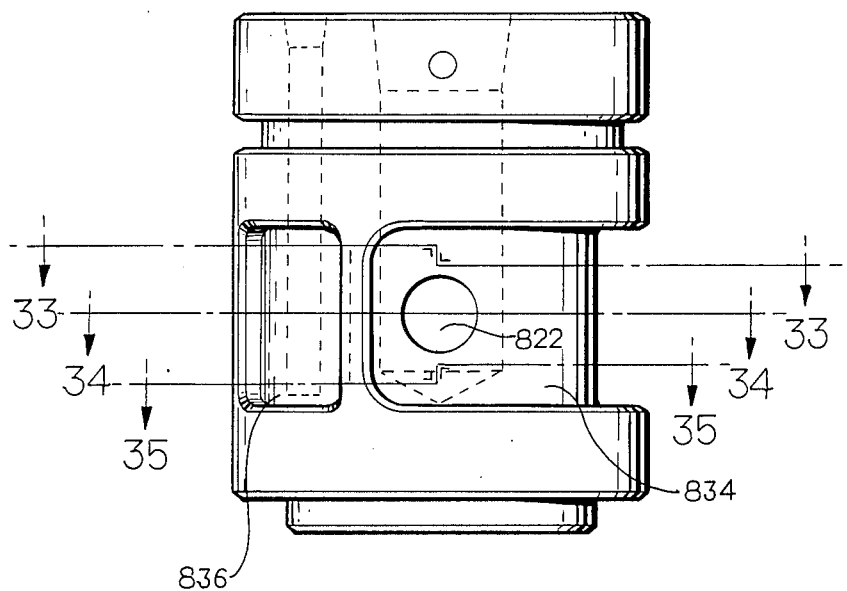
FIGS. 31 and 32 are side views of generally opposed sides of the cylinder.
Figure 32:
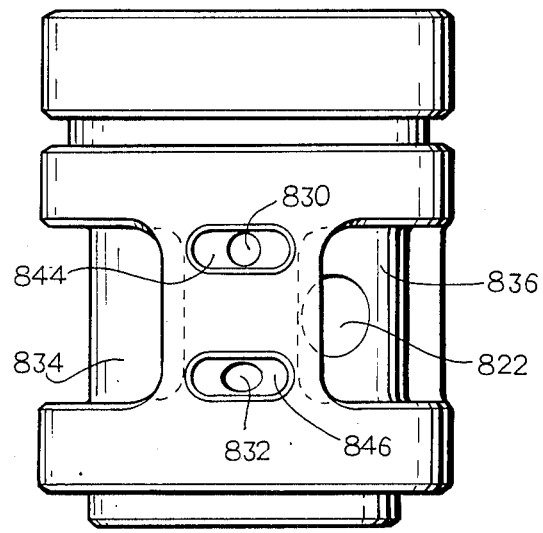
Figure 33:
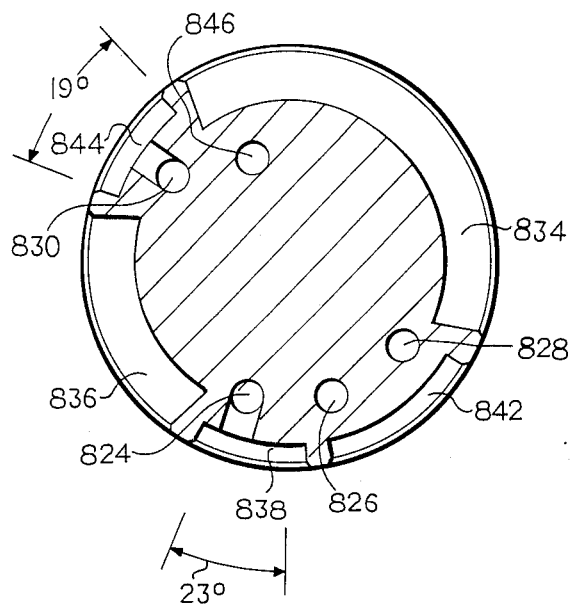
FIGS. 33, 34 and 35 are sectional views of the cylinder respectively taken generally on lines 33—33, 34—34 and 35—35 of FIG. 31.
Figure 34:
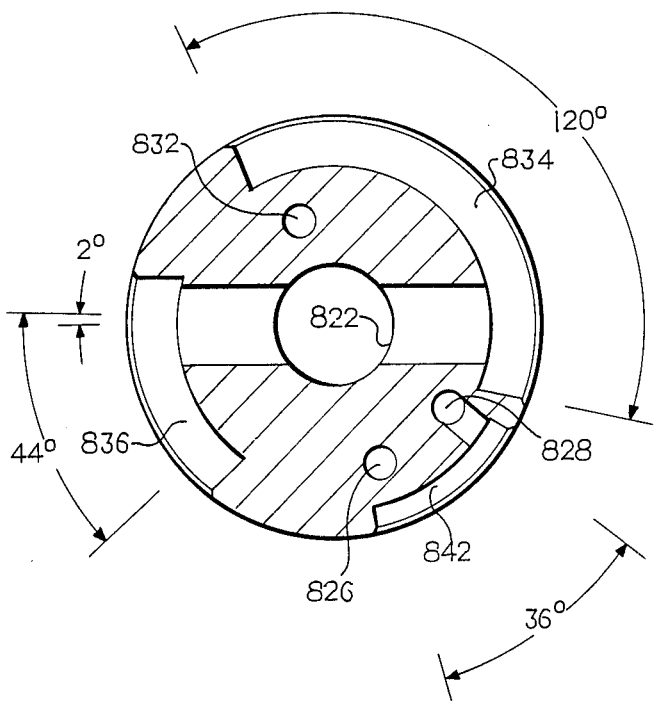
Figure 35:
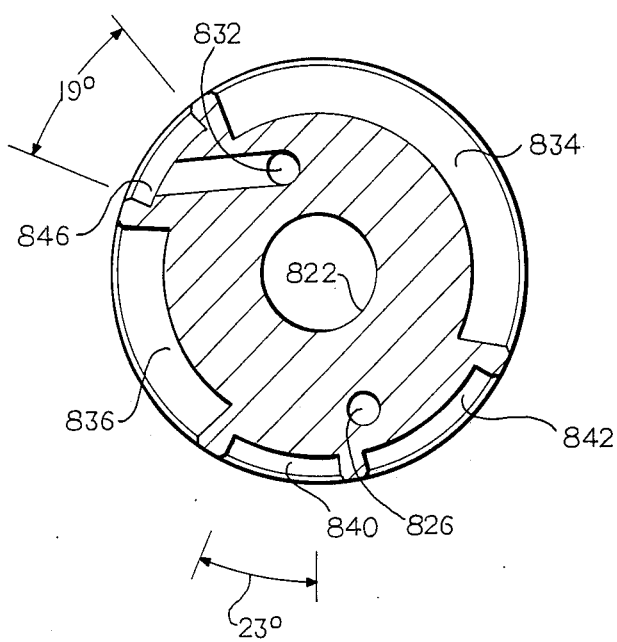
Figure 37:
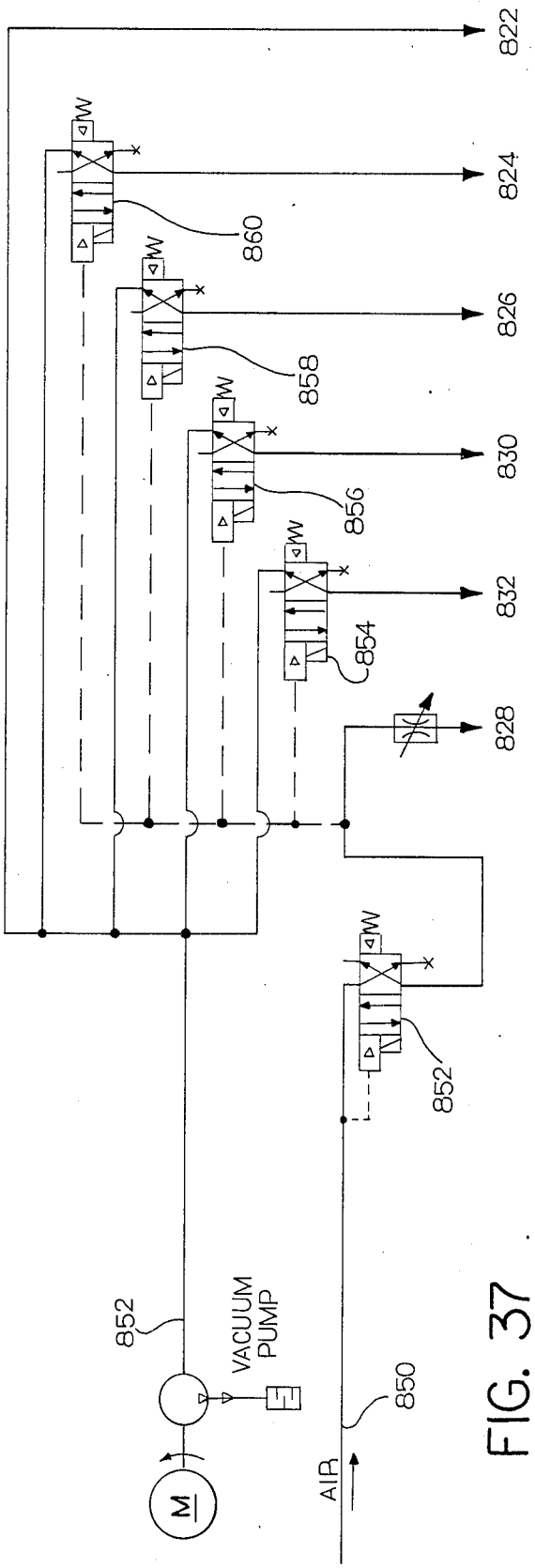
FIG. 37 is a schematic diagram illustrating connection of the distributor to sources of vacuum and compressed air through solenoid valves and conduits.

As shown in FIGS. 24–26, the pair of clamping fixtures 504 are secured to a support bracket 688 fixed to a head 690 of the test device. To accurately locate and securely clamp the articles, a pair of upper and lower nests 692 and 694 are secured to the platens of each fixture. As shown in FIG. 28, the nests have cavities 696 conforming to the shape and contour of the articles to be clamped. To ensure that the finish of an article received in these nests is exposed for testing they have a recess 698 adjacent the free end of the neck of the article.

In accordance with this invention, the test device 670 determines whether the machined finish of an article will produce an adequate seal when a closure cap is screwed on the neck. A satisfactory seal cannot be obtained if the neck is of insufficient length because a closure cap can not be screwed down far enough on the neck to firmly bear on the end face of the neck. Moreover, even if the neck is of sufficient length, a satisfactory seal cannot be obtained if its end face is rough or sufficiently out of square with the axis of the neck. Hence, the test device determines whether the neck is of sufficient length and whether the article leaks when a sealing member bears on the end face of the neck with a predetermined force and air at a predetermined superatmospheric pressure is admitted to the article.

To supply compressed air to the interior of each article and to determine the sufficiency of the length of its neck, the test device has a pair of probes 700 for testing the articles. Each probe can be extended toward and retracted from an article received in an associated clamp fixture. As shown in FIG. 28, to supply compressed air to the interior of an article, there is a central passage 702 through each probe. To simulate a closure sealing membrer rings 704 of a sealing material such as rubber are received over the free end of the probe and bear on the flange of a collar 706 which is fixed and sealed airtight to the probe. To protect the free end of the probe when retracted, it is received in a tubular shield 708 fixed to the bracket 682 supporting the clamp fixtures.

Compressed air is produced and supplied to each probe by a pair of resilient bellows or air pumps 710 connected by fittings 712 and flexible tubes 714 to a tee 716 connected to an end of the probe and communicating with the passage 702 in the probe. The pumps are mounted on a bracket 718 secured to the head. To sense and produce a signal when compressed air leaks from an article, a pressure responsive electric switch (not shown) is also connected to the probe through the tee 716 and a suitable flexible tube. When the pumps supply compressed air through the probe to the interior of an article and for a predetermined period of time there is no leakage, the pressure responsive switch will change state only once, namely when compressed air is initially supplied to the article. However, if there is sufficient leakage in such predetermined period of time the switch will either change state twice due to a drop in pressure or not at all if the leakage is so severe insufficient pressure is achieved to trip the switch.

As shown in FIG. 25, the probes and pumps are actuated by a barriel cam 720 and a follower 722. The follower is received in a track 724 in the cam which provides a dwell when the probes are fully extended to provide sufficient time to complete the leak test. The barrel cam is keyed to a shaft 726 journaled for rotation by bearings 728 received in a housing 730 secured to the table 672. The follower 722 is secured to an actuator rod 732 slidably received in a bore 734 in the housing and having an actuator plate 736 fixed by a cap screw 738 to one end of the rod for movement therewith.

Figure 27:
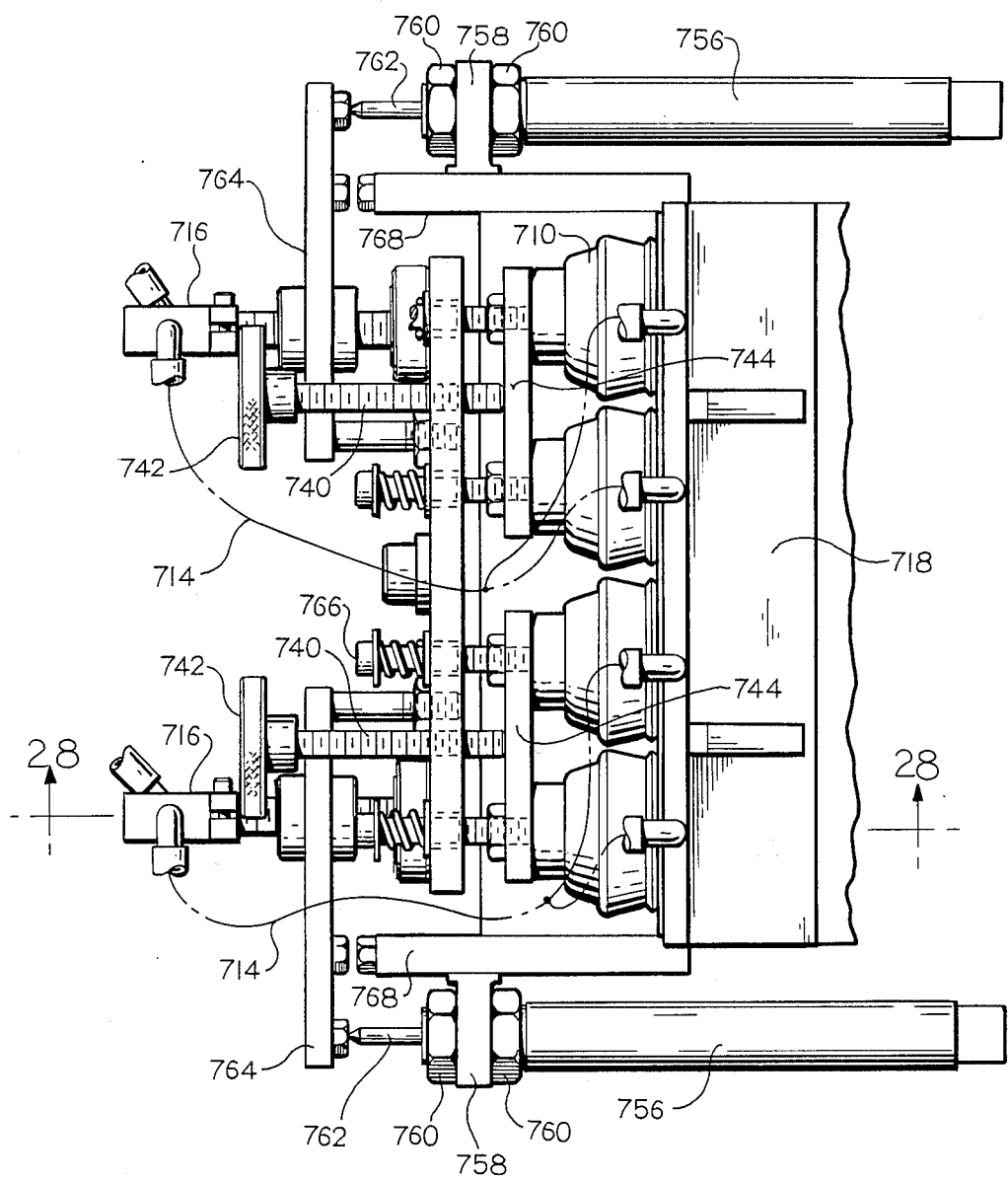
FIG. 27 is a fragmentary plan view taken generally on line 27—27 of FIG. 24 and illustrating a portion of the testing assembly.

To actuate and permit adjustment of the stroke of each pair of the pumps 710, as shown in FIG. 27, an adjustment screw 740 with a knurled knob 742 on one end is threaded through the actuator plate 736 and bears on a crossbar 744 which overlaps the free ends of a pair of the pumps. The crossbar 744 is slidably mounted on the actuator plate by a pair of cap screws 746 extending through oversize holes in the plate and threaded into the crossbar. The crossbar is yieldably urged into engagement with the adjustment screw 740 by springs 748 received on the cap screws.

To facilitate engagement of the probe with necks of varying lengths, as shown in FIG. 28 each 700 probe is slidably received in a sleeve 750 and yieldably urged toward an article by a compression spring 752 received on the probe between the sleeve and the collar. To reciprocate the probe, the other end of the sleeve 750 is secured to the actuator plate by a nut 752. When the sleeve is retracted sufficiently by the actuator plate, it bears on a jam nut 754 on the probe 700 and retracts the probe in unison with the sleeve.

To provide a signal indicative of the length of the neck of an article engaged by the probe, as shown in FIG. 27 an electromechanical transducer such as a linear variable differential transformer (LVDT) 756 is operatively associated with each probe. The LVDT is mounted by a bracket 758 and jam nuts 760 on the head 690 and its actuator 762 is moved by engagement with a crossbar 764 secured to the probe by the jam nuts 754. To keep the crossbar 764 aligned with the LVDT and prevent rotation of the probe, a pin 766 extends through an oversize slot in the crossbar and is threaded into the actuator plate 736. The extent of travel of the probe toward an article is limited by a positive stop 768 engageable with the crossbar. Since the clamping fixture accurately locates the bottom of the neck (the portion of the shoulder immediately adjacent the neck) with respect to the housing, the position of the probe 700 when it engages the end face on the neck, and hence the LVDT, provides a highly accurate indication of the length of the neck.

To enable the cycle time of the apparatus to be easily adjusted, the barrel cam 720 actuating the test device 670 is driven by the variable speed electric motor 110. As shown in FIG. 24, this barrel cam is driven by a shaft 770 connected by a coupler 772 to the power takeoff shaft 128 in the inspection station and a drive chain 774 received on a pair of sprockets 776 and 778. As shown in FIG. 25, the sprocket 776 is fixed to a hub 780 secured to the shaft 726 which is keyed to the barrel cam. To permit the table 672 to be moved, the other sprocket 778 is fixed to a sleeve 782 slidably received on and engaging a splined portion 784 of the shaft 770 for rotation therewith. The sleeve 782 is journaled and captured in a bearing housing and support 786 fixed to the table 672 carrying the test device.

REJECT STATION in the reject station 46, all articles which did not pass the inspection performed by the test device 670 are released and disengaged from the vacuum cups 150 by which they were held. Either one or both of the articles can be released by cutting off the supply of vacuum to their associated vacuum cups. To ensure that the articles are released, preferably compressed air is also supplied to their associated vacuum heads. The released articles drop into a bin or onto a conveyor placed in the reject station and are discarded. Since the rejected articles are released and disengaged from the vacuum heads they can not be and are not moved into the unload station.

UNLOAD STATION

In the unload station 48, when the articles 34' are directly over the conveyor 36 they are released and disengaged from their vacuum heads 50 to deposit the trimmed and inspected articles directly on the conveyor in their upright position. The articles are released by cutting off the supply of vacuum to their associated vacuum cups. To ensure that the articles are released, preferably compressed air is supplied to their associated vacuum heads.

VACUUM HEAD DISTRIBUTOR

So that the vacuum cups 150 for carrying each article in each head 50 will engage and release articles in the desired sequence for operation of the triming apparatus 30, vacuum or compressed air is supplied to the vacuum heads through a distributor 800 mounted on the turntable 54. As shown in FIGS. 29 and 30, the distributor has an inner drum 802 slidably received in a cylindrical outer case 804. The inner drum is secured by cap screws 806 to a bracket 808 which is fixed with respect to the base 62 and the outer case is secured by cap screws 810 to the table 54 for rotation therewith and relative to the drum. The side wall 812 of the case has two rows of equally circumferentially spaced upper ports 814 and lower ports 816 with ten ports in each row. The vacuum cups 150 on the leading side of each head 50 are connected by hoses 818 to the lower ports 816 and the vacuum cups on the trailing side of each head 50 are connected by the hoses 820 to the upper ports 814.

As shown in FIG. 29, the drum has six inlet ports 822, 824, 826, 828, 830, and 832 which communicate with various recesses in the side wall of the drum and as the side wall rotates the various recesses intermittently communicate with some of the ports in the side wall of the case to supply vacuum or compressed air to the various vacuum cups carrier by the heads. As shown schematically in FIG. 36, the passages and recesses are arranged to normally continuously supply through the inlet 822 a vacuum to all of the vacuum cups 50 while they are in or moving through station Nos. 1 through 4 and 7; and to normally supply compressed air through the inlet 828 to all the vacuum cups while they are in the release station No. 9. The passages and recesses are also arranged to isolate and separately communicate with the upper and lower ports 814 and 816, and hence the vacuum cups on the leading and trailing sides of the heads, when they are in or passing through station Nos. 5 and 8. This isolation and separation permits either vacuum or compressed air to be supplied to either retain or reject each article carried by each head in each of these stations. These stations are immediately after the deflash and inspection stations respectively and hence articles can be rejected in either of these stations. In station No 5. inlet 830 communicates only with the upper port 814 and inlet port 832 communicates with only the lower port 816. In station No. 8 inlet 824 communicates with only the upper port 814 and inlet 826 communicates with only the lower port 816.

Figure 36:
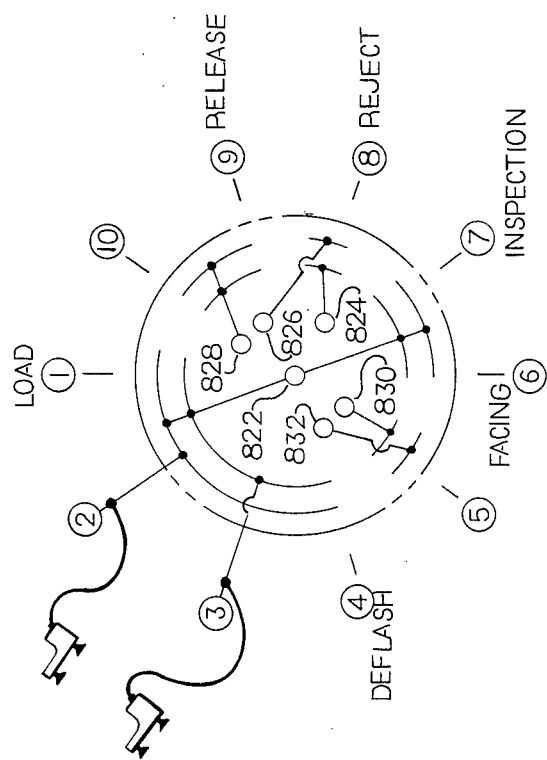
FIG. 36 is a schematic diagram illustrating coupling by the distributor of the vacuum heads in the various work stations of the trimming apparatus to sources of vacuum and compressed air.

As shown in FIGS. 29–35, the drum is constructed and arranged so that the inlet ports communicate with the upper and lower outlet ports in the distributor sidewall in the manner just described as shown in FIG. 36. Thus, the inlet port 822 communicates with drum recesses 834 and 836 each of which has a sufficient axial height to simultaneously communicate with both the upper and lower ports in the distributor sidewall. The drum is arranged so that the inlet port 824 communicates with the recess 838 in the drum which is narrow enough to register with only the upper ports in the distributor sidewall. The inlet port 826 communicates with the recess 840 in the drum which is narrow enough to communicate with only the lower ports in the distributor sidewall. The inlet port 828 communicates with the recess 842 which has a sufficient height to communicate with both the upper and lower ports in the distributor sidewall. The inlet port 830 communicates with the drum recess 844 which is narrow enough to communicate with only the upper ports in the distributor sidewall. The inlet port 832 communicates with the drum recess 846 which is narrow enough to communicate with only the lower ports in the distributor sidewall. The preferred angular or circumferential width of the recesses is set forth in FIGS. 33–35. The circumferential width of the drum adjacent each end of the recesses 838, 840, 844 and 846 is narrow enough in relation to the width of the ports in the distributor sidewall that as these ports approach or leave these recesses they are never completely closed by the drum. This prevents an interruption of the vacuum supply on these ports when they approach or leave these recesses.

Preferably, as shown schematically in FIG. 36, a source of compressed air 850 and a source of vacuum 852 are supplied to the various inlet ports of the manifold through the four way solenoid valves 852, 854, 856, 858, and 860 connected by conduits to the sources and the inlet ports of the distributor as shown. With this arrangement the supply of vacuum and compressed air to the vacuum cups 150 can be readily controlled by conventional electrical and electronic circuitry.

SETUP OF THE TRIMMING APPARATUS

The trimming apparatus 30 is setup for use in conjunction with a conveyor accumulator 32 with a plurality of articles 34 to be trimmed. Preferably, the apparatus is also associated with a conveyor 36 to carry away trimmed articles 34' which have passed inspection. Preferably, chute 490 and a conveyor 492 are also associated with the deflashing station 40 to carry away the flash and scrap severed from the articles.

The equipment in the deflash, facing and inspection stations is moved to the desired position for a run of a given size of articles to be trimmed by turning the handwheels to move the tables on which the equipment is mounted. The distributor 800 for the vacuum heads 50 is connected to sources of vacuum and air. All of the motors and the conveyors are energized and to provide the desired cycle time the speed of the drive motor 110 is adjusted.

OPERATION OF THE TRIMMING APPARATUS

In the load station 38 articles are lifted from the conveyor 32 two at a time by the transfer mechanism 212 and then laterally separated by the cooperation of the cam 290 and the follower 292 associated with the slide 294 of the table 252 of the transfer mechanism before the articles are picked up and engaged by a vacuum head 50. In the load station each vacuum head 50 engages a pair of articles 34 and is then intermittently indexed through the stations by the turret assembly 52. The articles are moved through the stations while being continuously engaged by the same vacuum head 50. Vacuum is supplied to the vacuum cups 150 of the heads through the distributor 800 and the connecting hoses 818 and 820.

As the articles are transferred into the deflash station 40 by the turret assembly 52 they are shifted from the inclined to the horizontal position (as shown in FIG. 5) by the cooperation of section 198 of the cam 164 with the folower 166 of the head 50 carrying the articles. The articles are transferred between a pair of open trimming dies 320 and 322 which are closed by the press 328 to accurately locate and firmly clamp the articles while the flash 410 is severed from the articles. As the trimming dies become fully closed they sever the portion of the flash adjacent the shoulder and side of the neck of the articles. Thereafter, guillotine blades 464 are reciprocated by actuators 412 to sever the flash in the finish area of the articles and thereby remove the flash 410 from the articles. The severed flash falls onto the chute 490 and is carried away by the conveyor 492. After severing, the trimming dies are opened to release the articles so they can be transferred from the deflashing station by the turret assembly 52.

The articles are transferred by the turret assembly 52 into the facing station 42, between a pair of open nests which are closed by a clamping fixture 504 to accurately locate and firmly hold the articles while the ends of their necks are machined by a facing mechanism 506.

The facing mechanism is reciprocated to feed the cutting tools to the proper depth and then retract the cutting tools. After machining is completed the fixtures release the articles so they can be transferred by the turret assembly 52.

The articles are transferred into the inspection station between a pair of open nests which are closed by clamping fixtures 504 to accurately locate and firmly hold the articles while they are inspected by the testing device 670. Normally the probes 700 engage the end face of the articles and admit compressed air into the interior of the articles to determine whether they will leak when a closure is secured to the neck and whether the neck is of sufficient length so that the closure will seal. When the testing is completed the probes are retracted and the fixtures opened so the articles can be transferred by the turret assembly.

As the articles are transferred by the turret assembly 52 into the reject station they are shifted from the horizontal to the vertical position (as shown in FIG. 5) by the cooperation of the segment 208 of the cam 164 with the follower 166 of the head 50 carrying the articles. If one or both of the articles did not pass inspection, in the reject station such article or articles are disengaged from the vacuum head 50 and rejected. The articles are released and disengaged from the vacuum head by cutting off the source of vacuum and supplying compressed air to the vacuum cups 150 carrying the rejected article or articles. This is accomplished by energizing the solenoids 824 and/or 826 to release either one or both of the articles carried by the head. If the articles did pass inspection, they are simply transferred from this station by the turret assembly 52.

Articles which passed inspection are transferred into the unload station and when they are directly over the conveyor 36 they are released from the vacuum head 50. This deposits the articles in a upright position on the conveyor which carries them away. The articles are released by cutting off the source of vacuum and supplying compressed air to all the vacuum cups 150 of the head carrging the articles. This is accomplished by the distributor 800.

I claim:

1. An apparatus for trimming a hollow plastic article having flash and a finish for receiving a closure which comprises:
   a base,
   a plurality of stations about said base including
   a load station associated with said base,
   an unload station circumferentially spaced from said load station,
   a turret rotatably mounted on said base about an axis with respect to said base,
   means for intermittently rotating said turret,
   a plurality of vacuum heads for picking up the articles,
   means for selectively applying vacuum to said vacuum heads,
   means for mounting each said vacuum head on said turret, in circumferentially spaced relation for intermittent rotation with respect to said base, means for moving each said vacuum head for picking up and engaging an article at said load station, releasing an article at said unload station, and continuously engaging the same article throughout all stations between said load and unload stations unless such same article is rejected and released prior to said unload station,
   a loader apparatus at said load station constructed and arranged to present articles for picking by vacuum heads,
   a deflash station associated with said base, circumferentially spaced between said load and unload stations,
   a deflasher apparatus at said deflasher station including opposed dies for holding a hollow plastic article and means for removing flash from an article while such article is being held by said dies and is continuously engaged by an associated vacuum head, and
   a facing station associated with said base, circumferentially spaced between said load and unload stations,
   a facing apparatus at said facing station including nests for clamping a hollow plastic article and including a facer tool for removing material from a finish of an article to form an opening for receiving a closure while such article is being clamped by said nests and continuously engaged by an associated vacuum head.

2. The apparatus of claim 1 wherein said means for mounting each said vacuum head comprises a mounting member individual to each said vacuum head and means for mounting said mounting member on said turret such that the axis of an article engaged by said head can be positioned generally parallel to, inclined to, or generally perpendicular to the axis of rotation of said turret, and a means associated with each mounting member and constructed and arranged to move such mounting member to orient the associated head in a predetermined desired position at each station.

3. The apparatus of claim 2 wherein said said means for moving said mounting member and associated vacuum head comprises a cam carried in fixed relationship relative to said base, and a cam follower operatively associated with each said mounting members and carried by said turret for rotation therewith.

4. The apparatus of claim 1 wherein said means for intermittently rotating said turret comprises a variable speed drive, a turret actuator mechanism connected to said variable speed drive and constructed and arranged to intermittently rotate said turret to advance an article successively through each of said stations, and a loader actuator mechanism connected to said variable speed drive and constructed and arranged to actuate said loader apparatus in said load station to pickup and transfer an article to a vacuum head, whereby the cycle time for said apparatus to trim an article can be varied and controlled by adjusting said variable speed drive thereby simultaneously adjusting the speed of intermittent rotation of said turret and the speed of actuation said loader apparatus.

5.

The apparatus of claim 1 wherein said means for intermittently rotating said turret comprises a variable speed drive, a turret actuator mechanism connected to said variable speed drive and constructed and arranged to intermittently rotate said turret to advance an article successively through each of said stations, a loader actuator mechanism connected to said variable speed drive and constructed and arranged to actuate said loader apparatus in said load station to pickup and engage an article, and a deflasher actuator mechanism connected to said variable speed drive and constructed and arranged to actuate said deflasher apparatus in said deflash station, whereby the cycle time for said apparatus to trim an article can be varied and controlled by adjusting said variable speed drive thereby simultaneously adjusting the speed of intermittent rotation of said turret, and the speed of actuation of said loader apparatus and said deflasher apparatus.

6. The apparatus of claim 1 wherein said means for intermittently rotating said turret comprises a variable speed drive, a turret actuator mechanism connected to said variable speed drive and constructed and arranged to intermittently rotate said turret to advance an article succesively through each of said stations, a loader actuator mechanism connected to said variable speed drive and constructed and arranged to actuate said loader apparatus in said load station to pickup and engage an article, a deflasher actuator mechanism connected to said variable speed drive and constructed and arranged to actuate said deflasher apparatus in said deflash station, a facer actuator mechanism connected to said variable speed drive and constructed and arranged to actuate said facer apparatus in said facing station, whereby the cycle time for said apparatus to trim an article can be varied and controlled by adjusting said variable speed drive thereby simultaneously adjusting the speed of intermittent rotation of said turret, and the speed of actuation of said loader apparatus and said deflasher apparatus and said facer apparatus.

7. The apparatus of claim 1 including an inspection station associated with said base, generally circumferentially spaced between said facing and unloading stations, a pressure inspection apparatus at said pressure station and having a pressure head movable into engagement with the finish of an article for admitting a fluid under pressure to the interior of such article.

8. The apparatus of claim 7 wherein said means for intermittently rotating said turret comprises an inspection station associated with said base, generally circumferentially spaced between said facing and unloading stations, and having a pressure head movable into engagement with the finish of an article for admitting a fluid under pressure to the interior of such article, a variable speed drive, a turret actuator mechanism connected to said variable speed drive and constructed and arranged to intermittently rotate said turret to advance an article successively through each of said stations, a loader actuator mechanism connected to said variable speed drive and constructed and arranged to actuate said loader apparatus in said load stations to pickup and engage an article, a deflasher actuator mechanism connected to said variable speed drive and constructed and arranged to actuate said deflasher apparatus in said deflash station, a facer actuator connected to said variable speed drive and constructed and arranged to actuate said facer apparatus in said facing station, and a pressure head actuator mechanism connected to said variable speed drive and constructed and arranged to actuate said pressure head in said inspection station to move said pressure head into engagement with the finish of an article in said inspection station, whereby the cycle time for said apparatus to trim an article can be varied and controlled by adjusting said variable speed drive thereby simultaneously adjusting the speed of intermittent rotation of said turret, and the speed of actuation of said loader apparatus, said deflasher apparatus, said facer apparatus and said inspection apparatus.

9. The apparatus of claim 1 wherein said loader apparatus at said loader station comprises an accumulator for a plurality of articles, said accumulator being disposed at said load station generally below the vacuum heads when at said load station, said loader apparatus comprising a transfer mechanism at said load station, said transfer mechanism including at least one nest carried by said transfer mechanism movable between a lowered position wherein said nest is below and disengaged from any articles in said accumulator and a raised position wherein said nest picks up an article from said accumulator and positions such article for engagement and pickup by a vacuum head, and a transfer mechanism actuator means for moving said transfer mechanism to its lowered and raised positions.

10. The apparatus of claim 9 wherein said transfer mechanism actuator comprises a crank journaled for rotation, a lever connecting said crank with said transfer mechanism, and a counterweight carried by said crank and constructed and arranged to counterbalance said lever, transfer mechanism and nest.

11. The apparatus of claim 9 wherein said means for intermittently rotating said turret comprises a variable speed drive connected to said transfer mechanism actuator means, and a turret actuator mechanism connected to said variable speed drive and constructed and arranged to intermittently rotate said turret to advance articles carried by said vacuum heads through said stations, whereby the cycle time for said apparatus to trim an article can be varied and controlled by adjusting said variable speed drive thereby simultaneously adjusting the speed of actuation of said transfer mechanism and the speed of intermittent rotation of turret.

12. The apparatus of claim 9 wherein said means for mounting each said vacuum head comprises a mounting member individual to each said vacuum head and means for mounting said mounting member on said turret such that the axis of an article when engaged by said head can be positioned generally parallel to, inclined to, or generally perpendicular to the axis of rotation of said turret, and means associated with each mounting member and constructed and arranged to move such mounting member to orient the associated head in said inclined position at said load station and in a predetermined desired position at the other stations, and wherein said accumulator is disposed so that the axis of the article received therein which is at the load station and generally below the vacuum head is inclined to the axis of rotation of the turret at said acute angle, and the transfer mechanism is constructed and arranged to move along a path between its lowered and raised positions which is generally perpendicular to the axis of such article, whereby when the transfer mechanism is moved to the raised position to transfer such article to a vacuum head the axis of such article is inclined to the axis of rotation of said turret at said acute angle.

13. The apparatus of claim 12 which also comprises a positive stop at said load station constructed and arranged to bear on the bottom of an article while it is transferred by said transfer mechanism from said accumulator to a vacuum head, whereby the articles are located on the vacuum heads in a predetermined desired position with respect to the bottom of the articles.

14. The apparatus of claim 1 wherein said deflasher apparatus comprises a support at said deflash station, a pair of generally opposed platens carried by said support and constructed and arranged to be moved toward and away from articles positioned in said deflash station by said vacuum heads, said dies being carried by said platens in generally opposed relation such that they are disengaged from such articles when said platens are moved away from such articles and engage such articles for removal of flash therefrom when such platens are moved sufficiently toward such articles, and a platen actuator mechanism constructed and arranged to move said platens toward and away from each other.

15. The apparatus of claim 14 wherein said deflasher apparatus comprises a movable blade carried by one of said platens and constructed and arranged to remove material from the finish of articles and a blade actuator constructed and arranged to drive said blade to remove said material.

16. The apparatus of claim 14 wherein said means for intermittently rotating said turret comprises a variable speed drive, said variable speed drive being connected to said platen actuator whereby the cycle time for said apparatus to trim an article and rotate the turret can be varied and controlled by adjusting said variable speed drive.

17. The apparatus of claim 1 wherein said deflasher apparatus also comprises ways in fixed relation to said base, a carriage carried by said ways for reciprocal movement along a path generally transverse to the axis of rotation of said turret, said clamping nests and said facer tool being mounted on said carriage, and means for translating said carriage along said ways the position of said facer tool and nests with respect to articles carried by said vacuum heads can be varied and adjusted to adapt the apparatus for runs of articles of different sizes.

18. The apparatus of claim 14 wherein said platen actuator mechanism comprises a barrel cam carried by said support and journaled for rotation, and a cam follower associated with each platen and engageable with said barrel cam.

19. The apparatus of claim 1 wherein said facing apparatus comprises ways at said facing station, a carriage carried by said ways for reciprocal movement generally toward and away from the finish of an article in said facing station, a spindle carried by said carriage, journaled for rotation and adapted to receive said facer tool, and a carriage actuator constructed and arranged to reciprocate said carriage wherein said means for intermittently rotating said turret comprises a variable speed drive connected to said carriage actuator whereby the cycle time for said apparatus to face an article and rotate the turret can be varied and controlled by adjusting said variable speed drive.

20. The apparatus of claim 19 wherein said facer also comprises a quill carried by said carriage for reciprocal movement with respect to said carriage generally toward and away from the finish of an article in said facing station, said spindle being journaled for rotation in said quill, and a quill adjuster for adjusting the position of said quill and spindle with respect to said carriage.

21. The apparatus of claim 20 wherein said quill adjuster comprises a key way and a key each associated with one of said quill and carriage, said key way being inclined to the axis of said quill at an acute included angle, and a drive mechanism for moving said key along said key way to move said quill with respect to said carriage.

22. The apparatus of claim 1 wherein said facing apparatus comprises first ways at said facing station, a first carriage carried by said first ways for reciprocal movement generally toward and away from the finish of an article in said facing station, a spindle carried by said first carriage, journaled for rotation and adapted to receive a facer tool, and a carriage actuator mechanism constructed and arranged to reciprocate said first carriage, second ways in fixed relation to said base, a second carriage carried by said second ways for reciprocal movement along a path generally parallel to the axis of an article at said facing station, said first ways being carried by said second carriage, whereby the position of said facer in said facing station with respect to articles carried by said vacuum heads can be varied and adjusted to adapt the apparatus for runs of articles of different sizes.

23. The apparatus of claim 1 said nests for clamping engagement with articles received at said facing station, and a platen actuator mechanism constructed and arranged to move said platens toward each other between a first position wherein nests carried by said platens firmly engage an article received in said facing station and a second position away from each other wherein such nests are disengaged and sufficiently spaced from such article to permit such article to pass between such nests when such article is advanced by rotation of said turret.

24. The apparatus of claim 23 wherein said platen actuator comprises a reciprocating drive member carried by said fixture, a first link interconnecting said drive member and one of said platens, a lever pivoted intermediate its ends and carried by said fixture, a second link interconnecting one end of said lever and the other of said platens, and a third link interconnecting the other end of said lever and said drive member.

25. The apparatus of claim 23 wherein said clamping fixture comprises an adjustment mechanism carried by one of said platens and constructed and arranged to move a nest carried by said one platen generally transversely to the axis of an article engaged by such nests.

26. The apparatus of claim 1 including an inspection station associated with said base and generally circumferentially spaced between said facing and unload stations, a housing at said inspection station, a pressure head carried by said housing, said pressure head being movable with respect to said housing between a first position for engagement with the finish of an article at said inspection station for admitting a fluid under pressure to the interior of such article and a second position disengaged and spaced from such article, and a pressure head actuator mechanism constructed and arranged to move said pressure head between its first and second positions.

27. The apparatus of claim 26 wherein said means for intermittently rotating said turret comprises a variable speed drive connected to said pressure head actuator, whereby the cycle time for said apparatus to trim an article and rotate the turret can be varied and controlled by adjusting said variable speed drive.

28. The apparatus of claim 26 wherein said pressure head actuator comprises a barrel cam carried by said housing and journaled for rotation and a cam follower operably associated with said pressure head and engageable with said barrel cam.

29. The apparatus of claim 26 including an electromechanical transducer operably associated with said pressure head and constructed and arranged to produce an electric signal indicative of the location of the end face of the finish of such article when engaged by said pressure head, whereby it can be determined whether the location of such end face is within predetermined acceptable limits.

30. The apparatus of claim 29 wherein said electromechanical transducer comprises a linear variable differential transformer.

31. The apparatus of claim 26 wherein said inspection station also comprises ways in fixed relation to said base, a carriage carried by said ways for movement along a path generally parallel to the axis of articles in said inspection station, and said housing being carried by said carriage, whereby the position of said housing with respect to articles in said inspection station can be varied and adjusted to adapt the apparatus for runs of articles of different sizes.

32. The apparatus of claim 1 including an inspection station associated with said base and generally circumferentially spaced between said facing and unload stations, a housing at said inspection station, a pressure head carried by said housing, said pressure head being movable with respect to said housing between a first position for engagement with the finish of an article at said inspection station for admitting a fluid under pressure to he interior of such article and a second position disengaged and spaced from such article, a pressure head actuator constructed and arranged to move said pressure head between its first and second positions, a reject station generally circumferentially spaced between said inspection and unload stations, a conveyor disposed at said reject station and constructed and arranged to receive any articles released by said vacuum heads at said reject station, and a valve and electropneumatic circuitry constructed an arranged to relieve the vacuum on a vacuum head in said reject station in response to a reject signal from said inspection station.

33. The apparatus of claim 1 wherein said means for mounting each said vacuum head comprises a mounting member individual to each said vacuum head and means for mounting said mounting member on said turret such that the axis of an article engaged by said head can be positioned generally parallel to, inclined to, or generally perpendicular to the axis of rotation of said turret, a head actuator mechanism associated with each mounting member and constructed and arranged to move said mounting member to orient the associated head in a predetermined desired position at each station, a conveyor associated with said unload station for receiving articles released at said unload station by said vacuum head, said head actuator mechanism being constructed and arranged to move said mounting member so that at said unload station they orient each article is oriented with its axis generally parallel to the axis of rotation of said turrent for transfer to said conveyor.

34. The apparatus of claim 33 wherein said conveyor is disposed generally under an article at said unload station carried by said head and such an article is desposited on said conveyor when released at said unload station by its associated head.

35. The apparatus of claim 33 which also comprises an accumulator for a plurality of articles, said accumulator being disposed at said load station generally below the vacuum head when at said load station, and wherein said loader apparatus comprises a transfer mechanism in said load station, at least one nest carried by said transfer mechanism and constructed and arranged to receive an article therein, said transfer mechanism being movable from a lowered position wherein said nest is below and disengaged from any articles in said accumulator and to a raised position wherein said nest picks up an article from said accumulator and positions such article for engagement and pickup by a vacuum head, and a transfer mechanism actuator for moving said transfer mechanism between its lowered and raised positions.

36. The apparatus of claim 1 wherein said means for mounting each said vacuum head comprises a mounting member individual to each said vacuum head and means for mounting said mounting member on said turret said head actuator mechanism associated with each mounting member being constructed and arranged to move its associated mounting member to orient the associated head at said load station so that the axis of any article engaged thereby is inclined at an acute included angle to said axis of rotation of said turret, at said deflashing and facing stations so that the axis of any article engaged thereby is generally perpendicular to said axis of rotation of said turret, and at said unload station so that the axis of rotation of any article engaged thereby is generally parallel to said axis of rotation of said turret.

37. An apparatus for trimming a hollow plastic article having flash and a finish for receiving a closure which comprises:
a base,
a plurality of stations about said base including
a load station in fixed relation to said base,
an unload station in fixed relation to said base and spaced generally circumferentially from said load station,
a deflash station in fixed relation to said base and spaced generally circumferentially between said load and unload stations,
a facing station in fixed relation to said base and spaced generally circumferentially between said deflash and unload stations,
a turret associated with said base and rotatable about an axis for intermittent movement with respect to aid base,
means for intermittently rotating sad turret,
a plurality of head mounts carried by said turret in circumferentially spaced relation for intermittent rotation with respect to said base,
at least one vacuum head for holding an article carried by each of said head mounts, each of said head mounts being movable and constructed and arranged to move each of the heads carried thereby such that the axis of an article engaged by such heads can be oriented generally parallel to, inclined to, or generally perpendicular to the axis of rotation of said turret, and
a head mount actuator means associated with each head mount and constructed and arranged to move all head mounts to the same orientation in each given station where the orientation differs for at least one station from the orientation of another station.

38. The apparatus of claim 37 wherein said head mount actuator means comprises a plurality of cam followers carried by said turret, each of said mounting heads being operatively associated with one of said cam followers, and a cam carried by said base and engageable with said cam followers.

39. The apparatus of claim 37 which also comprises an accumulator for a plurality of articles, said accumulator being disposed at said load station generally below the vacuum heads when at said load station, a transfer mechanism at said load station, at least one nest carried by said transfer mechanism and constructed and arranged to receive an article therein, said transfer mechanism being movable between a lowered position wherein said nest is below and disengaged from any articles in said accumulator and a raised position wherein said nest picks up an article from said accumulator and positions such article for engagement and pickup by a vacuum head, and a transfer mechanism actuator for moving said transfer mechanism between its lowered and raised positions.

40. The apparatus of claim 39 wherein said transfer mechanism actuator comprises a crank journaled for rotation, a lever connecting said crank with said transfer mechanism, and a counterweight carried by said crank and constructed and arranged to counterbalance said lever, transfer mechanism and nest.

41. The apparatus of claim 39 wherein said means for intermittently rotating said turret comprises a variable speed drive connected to said transfer mechanism actuator, whereby the cycle time for said apparatus to trim an article and drive the turret can be varied and controlled by adjusting said variable speed drive.

42. The apparatus of claim 37 which also comprises a clamping fixture in said facing station having a pair of platens carried by said fixture in generally opposed relation for movement toward and away from an article received in such station, said platens being constructed and arranged to carry said nests for clamping engagement with articles received in such station, and a platen actuator mechanism constructed and arranged to move said platens toward each other between a first position wherein nests carried by said platens firmly engage an article received therebetween and away from each other and a second position wherein said nests are disengaged and sufficiently spaced from such article to permit such article to pass between such nests when such article is advanced by rotation of said turret.

43. The apparatus of claim 42 wherein said platen actuator comprises a reciprocating drive member carried by said fixture, a first link interconnecting said drive member and one of said platens, a lever pivoted intermediate its ends and carried by said fixture, a second link interconnecting one end of said lever and the other of said platens, and a third link interconnecting the other end of said lever and said drive member.

44. The apparatus of claim 37 wherein said means for intermittently rotating said turret a loader in said load station, and actuator mechanism connected to said variable speed drive and constructed and arranged to actuate said loader to pickup and transfer an article to a vacuum head, whereby the cycle time for said apparatus to load an article and rotate said turret can be varied and controlled by adjusting said variable speed drive.

45. The apparatus of claim 37 wherein said means for intermittently rotating said turret a loader in said load station, and actuator mechanism connected to said variable speed drive and constructed and arranged to actuate said loader to pickup and engage an article, and a deflasher in said deflash station, and actuator mechanism connected to said variable speed drive and constructed and arranged to actuate said deflasher in said deflash station, whereby the cycle time for said apparatus to load and trim an article and rotate said turret can be varied and controlled by adjusting said variable speed drive.

46. The apparatus of claim 37 which also comprises a clamping fixture in and one of said facing and inspection station having a pair of platens carried by said fixture in generally opposed relation for movement toward and away from an article received in such station, said platens being constructed and arranged to carry said pair of nests for clamping engagement with articles received in such station, and a platen actuator constructed and arranged to move said platens toward each other to a first position wherein said nests carried by said platens firmly engage an article received therebetween and away from each other to a second position wherein said nests are disengaged and sufficiently spaced from such article to permit such article to pass between such nests when such article is advanced by rotation of said turret.

47. The apparatus of claim 37 which also comprises ways at said deflash station, a carriage carried by said ways for reciprocal movement generally toward and away from an article in said deflash station along a path generally transverse to the axis of rotation of said turret, and a deflasher carried by said carriage, whereby the position of said deflasher with respect to articles at said deflash station carried by said vacuum heads can be varied and adjusted to adapt the apparatus for articles of different sizes.

48. The apparatus of claim 47 which also comprises actuator means operatively associated with said carriage and being manually operable for moving said carriage on said ways.

49. The apparatus of claim 37 which also comprises ways at said facing station, a carriage carried by said ways for reciprocal movement generally toward and away from an article at said facing station along a path generally transverse to the axis of rotation of said turret, and a facer carried by said carriage, whereby the position of said facer with respect to articles at said facing station carried by said vacuum heads can be varied and adjusted to adapt the apparatus for articles of different sizes.

50. The apparatus of claim 49 which also comprises actuator means operatively associated with said carriage and being manually operable for moving said carriage on said ways.

51. An apparatus for trimming a hollow plastic article having flash and a finish for receiving a closure which comprises:
a base,
a plurality of stations about said base including a load station associated with said base,
an unload station circumferentially spaced from said load station,
a turret rotatably mounted with respect to said base,
a loader apparatus at said load station constructed and arranged to present articles for pickup by vacuum heads,
a plurality of vacuum heads for picking up the articles, said vacuum heads being carried by said turret in circumferentially spaced relation for intermittent rotation with respect to said base, each vacuum head being constructed and arranged to pickup and engage an article in said load station,
a deflash station associated with said base, circumferentially spaced between said load and unload stations, and having a deflasher constructed and arranged to remove flash from an article while such article is in said deflash station,
a facing station associated with said base, circumferentially spaced between said load and unload stations, and having a facer constructed and arranged to remove material from a finish of an article to form an opening for receiving a closure while such article is in said facing station,
a variable speed drive, a turret actuator mechanism operably connected to said variable speed drive and constructed and arranged to intermittently rotate said turret to advance a vacuum head successively through each of said stations, a loader actuator mechanism operably connected to said variable speed drive and constructed and arranged to actuate said loader apparatus to pickup and transfer an article to a vacuum head in said load station, a deflasher actuator mechanism operatively associated with said variable speed drive and constructed and arranged to actuate said deflasher to remove flash from an article while in said deflash station, and a facer actuator mechanism operably connected to said variable speed drive and constructed and arranged to actuate said facer to remove material from a finish of an article while in said facing station, whereby the cycle time for said apparatus to trim an article can be varied and controlled by adjusting said variable speed drive thereby simultaneously adjusting the speed of intermittent rotation of said turret and the speed of actuation of said loader.

52. The apparatus of claim 51 wherein said variable speed drive includes a variable speed electric motor.

53. The apparatus of claim 51 wherein said variable speed drive includes a viriable speed transmission.

54. The apparatus set forth in claim 10 wherein said transfer mechansim comprises a slide, said lever connecting said slide with said crank.

55. The apparatus set forth in claim 9 wherein said load apparatus comprises a pair of nests, and means for supporting and moving the nests laterally relative to one another after a pair of articles are picked up by said nests from said accumulator to space the articles for engagement and pick up by vacuum heads.

56. The apparatus set forth in claim 55 wherein said means for supporting and moving said nests laterally relative to one another comprises a slide on which one of said nests is mounted for relative movement relative to the other and means for moving said slide toward and away from said other nest.

57. The apparatus set forth in claim 56 wherein said last-mentioned means comprises a cam and a cam follower on said slide engaging said cam.

* * * * *